United States Patent
Shiraiwa et al.

[11] Patent Number: 6,160,579
[45] Date of Patent: *Dec. 12, 2000

[54] IMAGE PROCESSING APPARATUS AND METHOD

[75] Inventors: Yoshinobu Shiraiwa, Machida; Yoshiro Udagawa, Saitama-ken; Kenji Takahashi; Eiichiro Ikeda, both of Kawasaki; Yumiko Hidaka, Inagi, all of Japan

[73] Assignee: Canon Kabushiki Kaisha, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/689,054

[22] Filed: Jul. 30, 1996

[30] Foreign Application Priority Data

| Aug. 1, 1995 | [JP] | Japan | 7-196677 |
| Aug. 11, 1995 | [JP] | Japan | 7-205886 |
| Aug. 23, 1995 | [JP] | Japan | 7-214552 |

[51] Int. Cl.$^7$ .................................................. H04N 9/04
[52] U.S. Cl. .......................................... 348/224; 348/228
[58] Field of Search .................................. 348/222, 223, 348/224, 225, 228, 229, 230, 231

[56] References Cited

U.S. PATENT DOCUMENTS

| 4,901,152 | 2/1990 | Hieda et al. | 348/228 |
| 5,111,289 | 5/1992 | Lucas | 348/148 |
| 5,295,001 | 3/1994 | Takahashi | 358/482 |
| 5,347,371 | 9/1994 | Nishimura | 348/228 |
| 5,406,391 | 4/1995 | Takahashi | 358/482 |
| 5,424,774 | 6/1995 | Takayama et al. | 348/222 |
| 5,448,292 | 9/1995 | Matsui | 348/225 |
| 5,488,414 | 1/1996 | Hirasawa et al. | 348/207 |
| 5,796,428 | 8/1998 | Matsumoto | 348/231 |

FOREIGN PATENT DOCUMENTS

| 0258673 | 3/1988 | European Pat. Off. . |
| 0363988 | 4/1990 | European Pat. Off. . |
| 0502369 | 9/1992 | European Pat. Off. . |
| 5-183789 | 7/1993 | Japan . |
| 7-131796 | 5/1995 | Japan . |
| 2182821 | 5/1987 | United Kingdom . |

*Primary Examiner*—Bryan Tung
*Attorney, Agent, or Firm*—Fitzpatrick, Cella, Harper & Scinto

[57] ABSTRACT

In converting image sensing data into image data, a plurality of image sensing data meeting a predetermined condition are processed as a group of image sensing data. An image reproduction parameter is obtained from this image sensing data group, and each image sensing data of the image sensing data group is converted into image data by using the image reproduction parameter. Accordingly, an image reproduction parameter for obtaining an optimum reproduced image can be accurately set from the image sensing data group. Also, since a reproduction luminance level (range) is determined from the image sensing data group, the correlation between the luminances of image planes is not lost. This allows an easy comparison of reproduced images and prevents the boundaries of luminances from becoming unnatural when the reproduced images are synthesized.

8 Claims, 15 Drawing Sheets

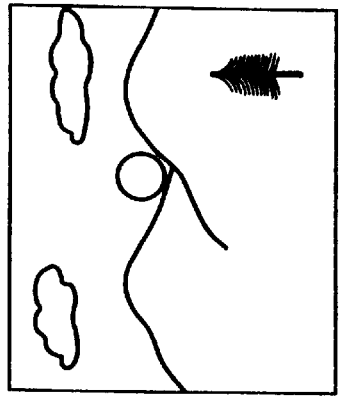
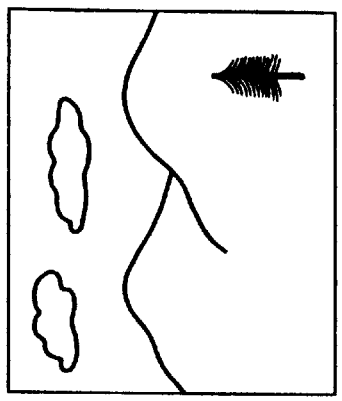
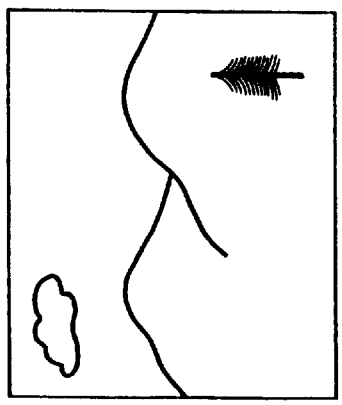
*FIG. 6*
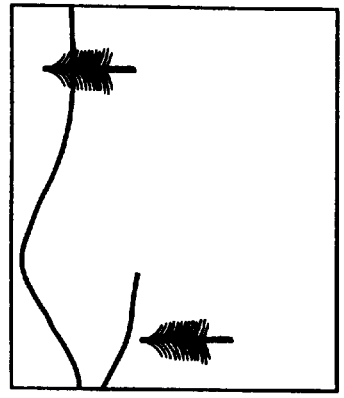
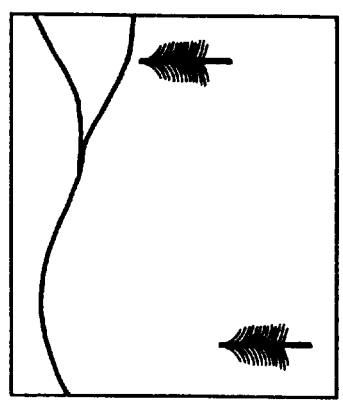
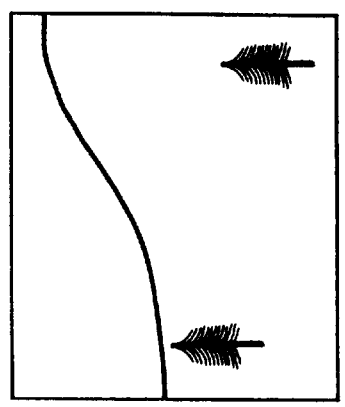
*FIG. 7*

IMAGE PROCESSING APPARATUS AND METHOD

BACKGROUND OF THE INVENTION

1. Field of the Invention

The present invention relates to an image processing apparatus and method and, more particularly, to an image processing apparatus and method of adjusting the hue of an input image signal.

The present invention also relates to an image reproducing method and apparatus and, more particularly, to an image reproducing method and apparatus for converting an image sensing signal obtained from an image sensing device, such as an image sensing tube or a CCD, into a visualizable image signal, e.g., an NTSC-RGB signal.

2. Description of the Related Art

In a television camera using an image sensing device such as a CCD, some image reproduction parameters are generally determined from image sensing data during image reproduction processing, in order to constantly obtain images which apparently give the same impression or to obtain as faithful reproduced images as possible regardless of deterioration with time of the image sensing device or a color filter and changes in an illuminating light source. The image sensing data is two-dimensional digital image data formed from an image signal obtained by photographing an object by using an image sensing device.

Examples of the image reproduction parameters are a color temperature and a reproduction luminance level. The image production parameters are used to correct the color temperature or set the reproduction luminance level.

More specifically, the correction of the color temperature is to adjust a so-called white balance so that an object which is supposed to look white looks white. Generally, this color temperature correction is performed on the basis of image sensing data. That is, data of an object which is supposed to look white is extracted from image sensing data, and a white balance coefficient as one image reproduction parameter is determined on the basis of the extracted data. In the white balance adjustment, a plurality of color component signals constituting an output image signal from an image sensing device are amplified in accordance with the white balance coefficient. Consequently, the signal levels of the color components constituting the image signal of the object which is supposed to look white are so adjusted as to be equal to each other.

The setting of the reproduction luminance level is done by calculating a luminance distribution from image sensing data and setting an optimum reproduction luminance level (range). The parameter is adjusted such that a reproduced image is obtained within this range, and the image is reproduced.

FIGS. 1 and 2 are block diagrams showing configurations for performing the color temperature correction.

Referring to FIG. 1, complementary color data (consisting of color component signals of magenta Ma, green Gr, Yellow Ye, and cyan Cy) obtained by an image sensing unit 1 is supplied to a complementary color-pure color converting unit 11. The complementary color data is converted into pure color data (consisting of color component signals of red R, green G, and blue B) in the converting unit 11. The white balance of the pure color data obtained by the complementary color-pure color converting unit 11 is adjusted by a white balance (WB) adjusting unit 12 in the subsequent stage, and the gamma of the data is corrected by a gamma correcting unit 4.

In the configuration shown in FIG. 1 as above, the WB adjusting unit 12 is arranged subsequently to the complementary color-pure color converting unit 11, and the color temperature correction is done by performing the white balance adjustment for the pure color data (R,G,B) after complementary colors are converted into pure colors. This configuration is advantageous in that the color temperature correction can be relatively easily performed because the gain of the pure color data (R,G,B) can be directly adjusted.

In the configuration shown in FIG. 2, on the other hand, a WB adjusting unit 2 adjusts the white balance of complementary color data (Ma,Gr,Ye,Cy) obtained by an image sensing unit 1. Thereafter, a complementary color-pure color converting unit 3 performs complementary color-pure color conversion to obtain pure color data (R,G,B). This configuration has the advantage that a luminance signal with a higher resolution than that obtained in the configuration shown in FIG. 1 can be easily obtained.

The method of adjusting the hue of an image by adjusting the white balance is effective when many objects which are supposed to look white exist in an image signal obtained from an image sensing device. However, no such object which is supposed to look white exists in an image signal or only a very few such objects exist in an image signal in specific instances. In these instances, therefore, it is in principle impossible to adjust the hue by adjusting the white balance. In such instances, the general approach is to average image sensing data of one image plane for each color component and adjust the white balance by using the average. However, a color indicated by the obtained average is not necessarily white (the color of a light source), and so the white balance cannot be accurately adjusted.

That is, the white balance coefficient cannot be accurately set if it is determined from image sensing data in order to obtain an optimum reproduced image.

Also, in the setting of the reproduction luminance level, if the reproduction luminance level (range) is determined for each image plane, the correlation between the luminances of a plurality of image planes is lost. This makes the comparison of reproduced images difficult, or the connection of luminances becomes unnatural when the reproduced images are synthesized.

For example, the above inconveniences are significant when an object which is to be originally, desirably photographed as one image plane is divisionally photographed because the photographing area is small and one image plane is formed by synthesizing image sensing data of the obtained image planes.

That is, in the method of obtaining an image production parameter for each image sensing data of one image plane, it is impossible to obtain a reproduced image which is used when information between a plurality of images is extracted by comparing and analyzing the images, such as when physical property information is obtained from luminance information. Also, if the reflectance of an object spatially, gradually changes, individual image sensing data obtained by divisionally photographing the object have different luminance levels (ranges). If images are reproduced by independently optimizing these image sensing data, the correlation between luminances originally corresponding to the respective image sensing areas is lost in the reproduced images. Accordingly, if one image is formed by synthesizing these images taken in the respective image sensing areas, an unnatural synthetic image in which the correlation between luminances is lost results.

The hue of an image is adjusted by adjusting the white balance as follows. An object which is supposed to look white under a certain photographing light source is photographed. The amplification factor of each of a plurality of color component signals constituting an image signal obtained from the image sensing device is so adjusted that the white object accurately looks white when the image signal is reproduced. That is, it can be considered that the white balance adjustment is performed to compensate for changes in the light source during photography.

Commonly, the white balance adjustment described above is a principal means for compensating for changes in the light source during photography. A white balance coefficient used in this white balance adjustment is obtained on the basis of information of the light source during photography.

Of a plurality of different image reproduction parameters used in image reproduction, some parameters are preferably obtained on the basis of information of the light source during photography, like the image reproduction parameter (white balance coefficient) used in the white balance adjustment. An example is a complementary color-pure color conversion matrix used to convert an image signal obtained by using a complementary color filter into a pure color signal.

The complementary color-pure color conversion matrix is determined by the spectral transmittance characteristic of a complementary color filter. Usually, the spectral transmittance characteristic of a complementary color filter is not ideal. The influence of this difference from the ideal characteristic changes in accordance with the characteristics of the light source during photography. That is, a complementary color-pure color conversion matrix optimally selected under a certain photographing light source gives an optimum complementary color-pure color conversion result under this light source. However, this matrix does not give suitable conversion results to all light sources.

When a photographing light source changes, therefore, it is desirable to change the complementary color-pure color conversion matrix in accordance with the light source. Also, the above two image reproduction parameters, i.e., the white balance coefficient and the complementary color-pure color conversion matrix, are related to each other under a certain photographing light source. Accordingly, it is undesirable to individually determine these parameters.

Generally, however, the complementary color-pure color conversion is performed by using a semi-fixed complementary color-pure color conversion matrix which is optimally set under a certain photographing light source. If the photographing light source changes, therefore, the influence of the difference of the spectral transmittance characteristic of a complementary color filter from the ideal characteristic increases. Also, a contradiction sometimes occurs between the white balance coefficient and the complementary color-pure color conversion matrix having the correlation. Consequently, no complementary color-pure color conversion can be properly performed, and this makes faithful reproduction of an image difficult.

SUMMARY OF THE INVENTION

The present invention has been made to individually or collectively solve the above conventional problems, and has as its object to provide an image processing apparatus and method capable of accurately setting, from a group of image sensing data, an image reproduction parameter for obtaining an optimum reproduced image.

To achieve the above object, one preferred embodiment of the present invention discloses an image processing apparatus for converting image sensing data obtained by image sensing means into a visualizable image signal by using an image reproduction parameter, comprising storage means for storing the image sensing data; designating means for designating a condition of selection of the image sensing data; selecting means for selecting image sensing data meeting the selection condition designated by the designating means from the image sensing data stored in the storage means; the holding means for holding the image sensing data selected by the selecting means; setting means for setting the image reproduction parameter on the basis of the image sensing data held by the holding means; and converting means for converting the image sensing data held by the holding means into the image signal by using the image reproduction parameter set by the setting means.

The present invention has been made to individually or collectively solve the above conventional problems, and has as its object to provide an image processing apparatus and method capable of converting an image sensing signal into an image signal by using a group of more accurate image reproduction parameters meeting the condition of a photographing light source.

To achieve the above object, one preferred embodiment of the present invention discloses an image processing apparatus for converting image sensing data obtained by image sensing means into a visualizable image signal by using a plurality of different image reproduction parameters, comprising setting means for setting at least one of the different image reproduction parameters; and converting means for converting the image sensing data into the image signal by using the image reproduction parameter set by the setting means, wherein the setting means sets at least one parameter on the basis of another one of the different image reproduction parameters.

The present intention has been made to individually or collectively solve the above conventional problems, and has as its object to provide an image processing apparatus and method capable of adjusting a color balance even when no object which is supposed to look white exists or only a few such objects exist.

To achieve the above object, one preferred embodiment of the present invention discloses an image processing apparatus comprising first input means for inputting an image signal; second input means for inputting position information indicating an arbitrary position of an image and image data in the position; extracting means for extracting the image data in the position corresponding to the position information from the image signal input from the first input means; setting means for setting an image processing parameter on the basis of the image data extracted by the extracting means and the input image data from the second input means; and processing means for processing the input image signal from the first input means by using the image processing parameter set by the setting means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 is a view for explaining composition information of an object;

FIG. 7 is a view for explaining image sensing data having a time continuity;

DETAILED DESCRIPTION OF THE PREFERRED EMBODIMENTS

Embodiments of the present invention will be described below with reference to the accompanying drawings.
<First Embodiment>
[Structure]

Figure 3:
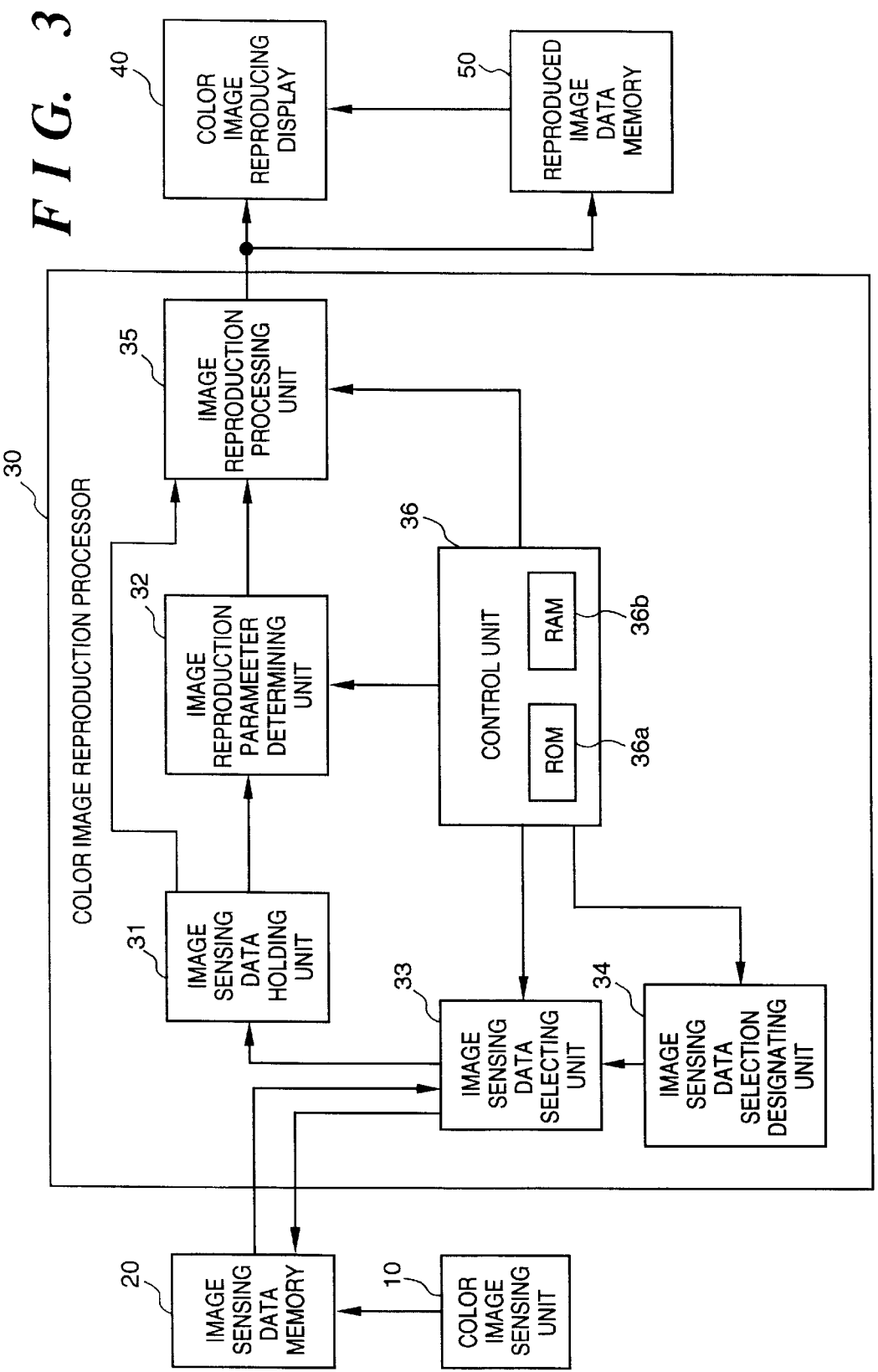
FIG. 3 is a block diagram showing the configuration of an image reproducing apparatus according to the first embodiment of the present invention.

FIG. 3 is a block diagram showing an embodiment of an image reproducing apparatus according to the present invention.

A color image sensing unit 10 such as a digital camera senses the image of an object and outputs the image sensing data of the object to an image sensing data memory 20. The image sensing data memory 20 stores the image sensing data supplied from the color image sensing unit 10.

A color image reproduction processor 30 performs predetermined image reproduction processing for the image sensing data stored in the image sensing data memory 20. For example, the color image reproduction processor 30 converts the image sensing data into digital NTSC-RGB data and outputs the digital data to a color image reproducing display 40 and a reproduced image data memory 50.

The color image reproducing display 40 includes a color video card and a monitor. The color image reproducing display 40 receives an output color image signal from the color image reproduction processor 30 or reads out a color image signal from the reproduced image data memory 50 and displays the signal as a color image on the monitor.

The reproduced image data memory 50 stores the image data reproduced by the color image reproduction processor 30. The image data stored in the reproduced image data memory 50 is supplied to and displayed by the color image reproducing display 40 as needed.

More specifically, the color image reproduction processor 30 comprises an image sensing data holding unit 31, an image sensing data selecting unit 33, an image sensing data selection designating unit 34, an image reproduction parameter determining unit 32, an image reproduction processing unit 35, and a control unit 36. The image sensing data holding unit 31 holds the digital image sensing data from the image sensing data memory 20. The image sensing data selecting unit 33 selects image sensing data from the image sensing data memory 20 and outputs the selected data to the image sensing data holding unit 31. The image sensing data selection designating unit 34 designates the condition by which the image sensing data selecting unit 33 selects image sensing data. The image reproduction parameter determining unit 32 determines an image reproduction parameter by using the image sensing data held by the image sensing data holding unit 31. The image reproduction processing unit 35 reproduces an image of the image sensing data held by the image sensing data holding unit 31 by using the image reproduction parameter determined by the image reproduction parameter determining unit 32. The control unit 36 controls these units of the color image reproduction processor 30.

The control unit 36 is constituted by, e.g., one-chip microcontroller (MPU) and executes various processes (to be described later) in accordance with programs previously stored in an internal ROM 36a. An internal RAM 36b of the MPU is used as a work memory of the MPU.

Examples of the image reproduction parameter determined by the image reproduction parameter determining unit 32 are parameters indicating a color temperature, a white balance coefficient, a color component gain, white point information, black point information, a gamma coefficient, a gradation characteristic, a gradation conversion curve, a gradation conversion lookup table, a knee point, a dynamic range, a color gamut, light source information, a color coordinate conversion matrix coefficient, a spatial frequency characteristic, a black balance coefficient, an SIN ratio, an auto-correlation coefficient, a Wiener spectrum, an intensity (density) distribution, and a luminance distribution, and parameters obtained directly or indirectly from these pieces of information.

The image sensing data selection designating unit 34 can designate the condition of selection in order that of a plurality of image sensing data stored in the image sensing data memory 20, image sensing data meeting a predetermined condition be processed as a group of image sensing data. The designated condition is given as a condition related to color temperature information or the composition of an object obtained from image sensing data, or as a predetermined condition pertaining to the photographing time, the photographing mode, the photographing place, the EV value, the aperture value, the object distance, the shutter speed, the use/nonuse of an electronic flash, or the use/nonuse of an optical low-pass filter, each of which is information appended to image sensing data.
[Image Reproduction Processing]

Figure 4:
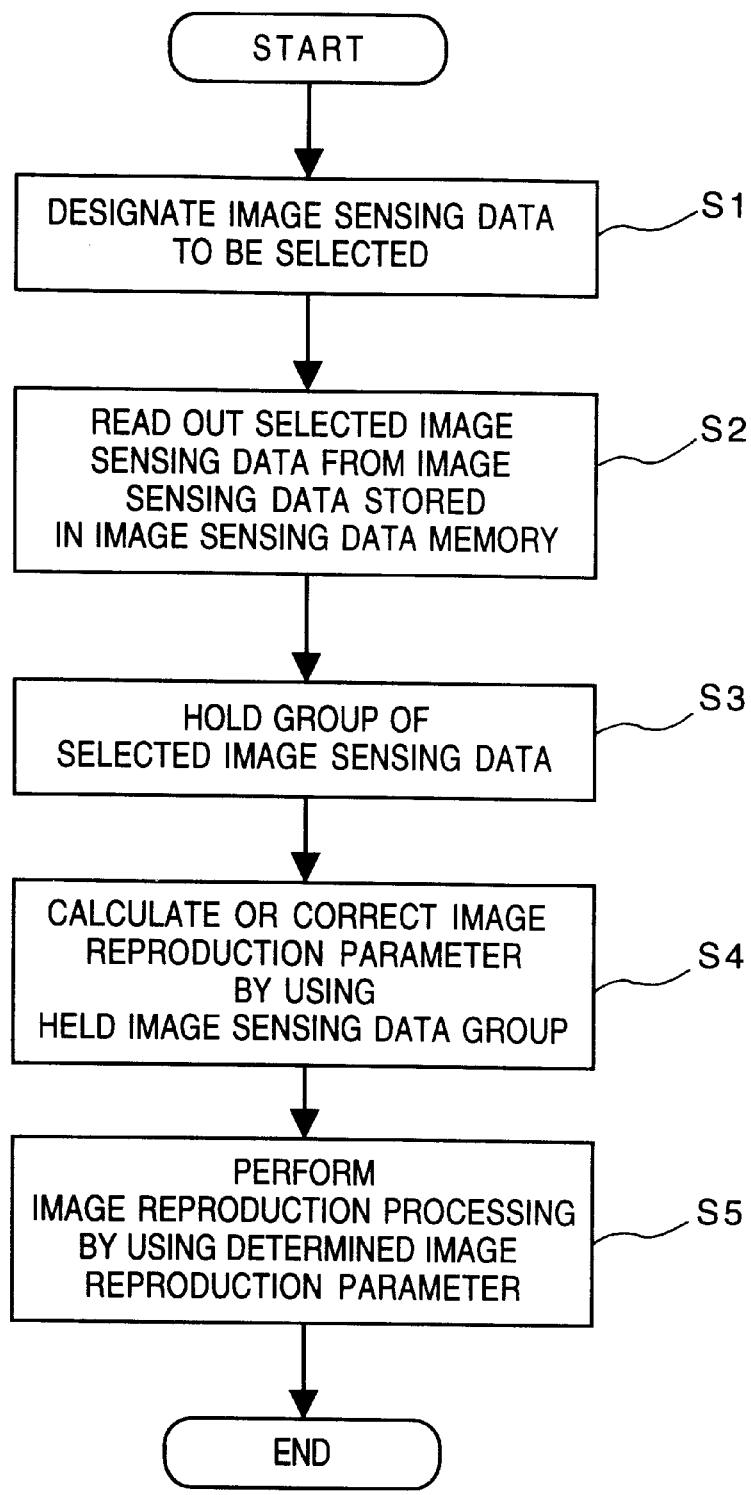
FIG. 4 is a flow chart showing the procedure of image processing done by the image processing apparatus of the first embodiment.

FIG. 4 is a flow chart showing the procedure of image processing done by the image reproducing apparatus of this embodiment. FIG. 4 shows processing executed by the color image reproduction processor 30. Assume that a plurality of image sensing data obtained by the color image sensing unit 10 are already stored in the image sensing data memory 20.

When the processing shown in FIG. 4 starts, the control unit 36 for controlling the processing checks the contents of image sensing data selection designated (in step S1) by the image sensing data selection designating unit 34 and sends the contents of the designated selection to the image sensing data selecting unit 33. On the basis of the contents of the selection designated by the image sensing data selection designating unit 34, the image sensing data selecting unit 33 selects image sensing data meeting the contents of the designated selection from the image sensing data stored in the image sensing data memory 20 and outputs the selected data to the image sensing data holding unit 31 (step S2). If the image sensing data meeting the contents of the designated selection is data of less than one image plane, this processing is not executed. If the selected image sensing data is data of one image plane, the image sensing data is converted into image data by ordinary image reproduction processing. If there is no image sensing data to be selected, information indicating this is output, and the processing is terminated.

The image sensing data holding unit 31 holds the group of image sensing data selectively output from the image sensing data memory 20 (step S3).

The image reproduction parameter determining unit 32 analyzes the image sensing data group held by the image sensing data holding unit 31, obtains, e.g., light source information (e.g., the color temperature or the chromaticity of the light source) when the image sensing data are obtained, which is necessary in white balance adjustment, and determines an image reproduction parameter on the basis of the light source information (step S4). That is, by using the plurality of image sensing data selectively output as a group of image sensing data from the image sensing data memory 20 and held in the image sensing data holding unit 31, the image reproduction parameter determining unit 32 determines an image reproduction parameter and sends the parameter to the image reproduction processing unit 35.

By using the image reproduction parameter thus determined, the image reproduction processing unit 35 performs image reproduction processing by which the image sensing data group held by the image sensing data holding unit 31 is converted into a group of image data (step S5).

[Selection Conditions of Image Sensing Data]

The conditions under which image sensing data are selected from a plurality of image sensing data so as to be processed as one group of image sensing data will be described below.

Information obtained from the analysis of image sensing data itself includes color temperature information and the composition of an object. It is sometimes necessary to process a plurality of image sensing data whose color temperatures are within a certain fixed range as a group of correlated image sensing data. Especially when the number of samples used to estimate color temperatures is small, the estimation accuracy can be increased by again estimating the color temperatures by using a plurality of image sensing data whose estimated color temperatures are within a certain fixed range. Consequently, image reproduction can be performed with a high accuracy.

If the compositions of objects are the same or very similar, there is a high possibility that the objects were photographed under the same photographing condition. Accordingly, the image reproduction parameters of the images are the same or can be processed as the same parameter within a certain fixed range of accuracy. If this is the case, an image reproduction parameter can be accurately obtained when it is obtained from a plurality of image sensing data. It is in many instances useful to process image sensing data having the same object composition or similar object compositions as a group of image sensing data.

Examples of information useful to find the correlation between image sensing data are the photographing time (date), the photographing mode, the photographing place, the EV value, the shutter speed, the aperture value, the object distance, the use/nonuse of an electronic flash, and the use/nonuse of an optical low-pass filter. If these pieces of information are given as information appended to image sensing data, a group of image sensing data can be generated by analyzing these pieces of information.

If the photographing times of image sensing data are within a certain fixed range, it is obviously effective to process these data as a group of image sensing data. It is also clearly effective to process a series of image sensing data whose imaging mode is a continuous shooting mode as a group of image sensing data. When an electronic flash is used, information of the photographing light source largely depends upon the characteristics of the flash light. Therefore, it is useful to simultaneously process a plurality of image sensing data, obtained by using an electronic flash, as a group of image sensing data.

Pieces of information such as the EV value, the shutter speed, the aperture value, and the object distance extremely largely depend upon the photographing conditions and function as strong restricting conditions when a reproduction parameter is determined. Therefore, image sensing data having these values within a predetermined range are processed as one image sensing data group. This is very efficient when image reproduction is performed.

In information of the photographing place, the characteristics of an object remain unchanged. Therefore, this information is very effective in accurately reproducing an object. Additionally, when this information is used in combination with information of, e.g., the photographing time (date), information on a change in the photographing conditions can also be obtained. This obviously increases the usefulness of the information of the photographing place.

In the above example, the condition for each individual information is primarily described. However, it is evident that the effectiveness is sometimes greatly improved by combining the above conditions.

Figure 5:
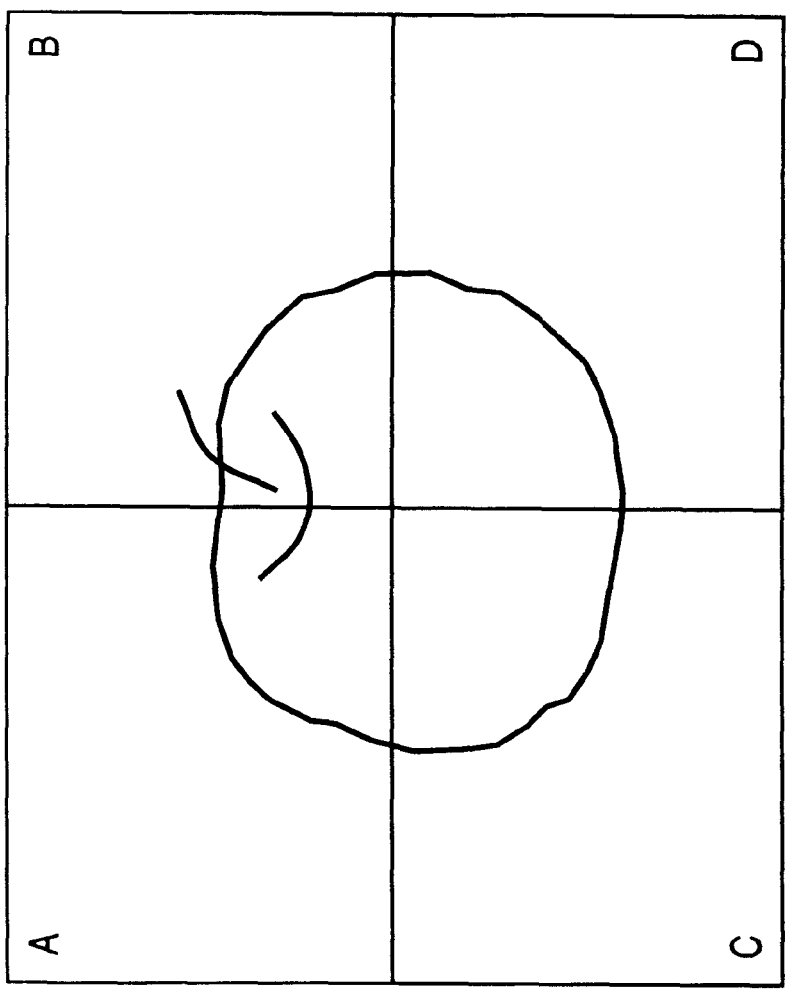
FIG. 5 is a view for explaining an example of a synthetic image.

As shown in FIG. 5, for example, as the condition of image reproduction processing, a plurality of image sensing data having a spatial continuity are sometimes designated to obtain a synthetic image. If this is the case, it is necessary to hold the spatial continuity in the synthetic image. For this purpose, it is very effective to perform image reproduction processing by processing a plurality of image sensing data as one group of image sensing data.

Also, as illustrated in FIG. 6, if it can be determined from photographing place information or composition information obtained by analyzing image sensing data that the image sensing data have a time continuity and are obtained from objects which are nearly the same, a reproduced image maintaining the time continuity can be obtained by processing these image sensing data as one group of image sensing data.

If these image sensing data are obtained outdoors, for example, an image can be reproduced while a continuous change with a change in the photographing time, i.e., the condition of sunshine, is held. More specifically, a reproduced image having a time continuity can be obtained by continuously changing an image reproduction parameter of image sensing data of an image sensing data group consisting of a plurality of image sensing data obtained from objects which are almost the same. This allows reproduction of an image while correcting disturbance occurring in some image sensing data due to a sudden change in the conditions. As a consequence, a temporally natural image can be obtained.

Also, as shown in FIG. 7, image sensing data having both a time continuity and a continuity in the photographing order, i.e., image sensing data obtained when the photographing mode is a continuous shooting mode, or image sensing data also having a spatial continuity, are processed as one group of image sensing data. Consequently, an extraneous condition occurring in each individual image sensing data can be eliminated, and this allows reproduction of an image keeping the continuity.

[Grouping of Image Sensing Data]

Grouping Using Color Temperature Information

Figure 8:
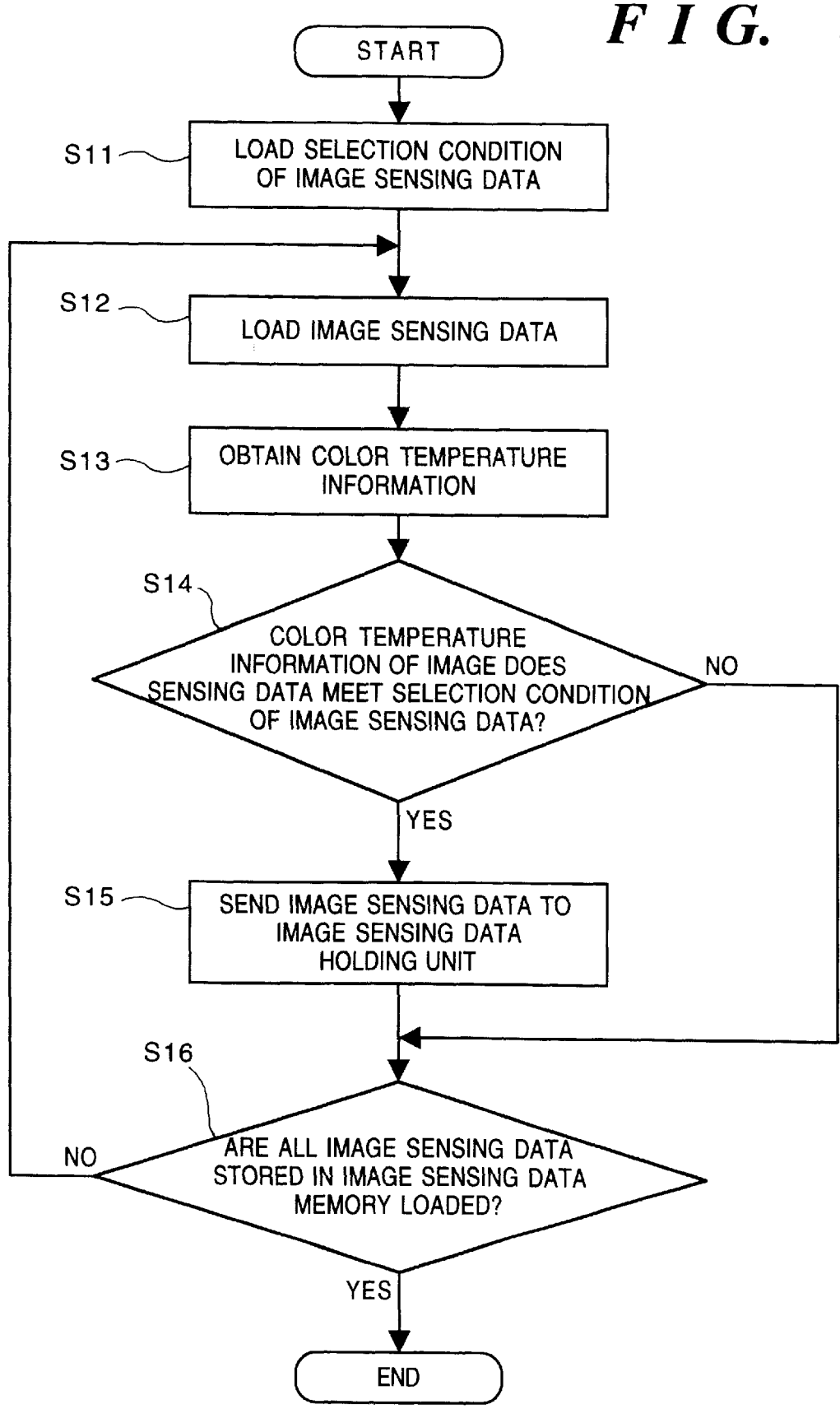
FIG. 8 is a flow chart showing image sensing data grouping processing.

A method of grouping image sensing data, i.e., a method of obtaining a group of image sensing data, by using color temperature information obtained from the analysis of image sensing data will be described in detail below. FIG. 8 is a flow chart showing the image sensing data grouping processing. The processing is executed by the control unit 36 by controlling the image sensing data selection designating unit 34 and the image sensing data selecting unit 33.

The conditions given by the image sensing data selection designating unit 34 are a correlated color temperature (A(K)) and its selecting range color temperature (±dA(K)). The correlated color temperature range is sometimes directly input by the user as a numerical value. It is also possible to input information related to the correlated color temperature, e.g., words such as "daytime", "evening", "sunset glow", "cloud", and "incandescent lamp", which the use can imagine in relation to the color temperature. That is, color temperature ranges corresponding to these words can be previously defined and stored in the ROM 36a, and a color temperature range corresponding to the information input by the user can be read out and used. Alternatively, the color temperature ranges corresponding to these words can be obtained by calculations (step S11 in FIG. 8). It is also possible to use adjectives such as "red" and "pale" from which the color temperatures can be imagined or practical values of a chromaticity or a color difference.

Figure 9:
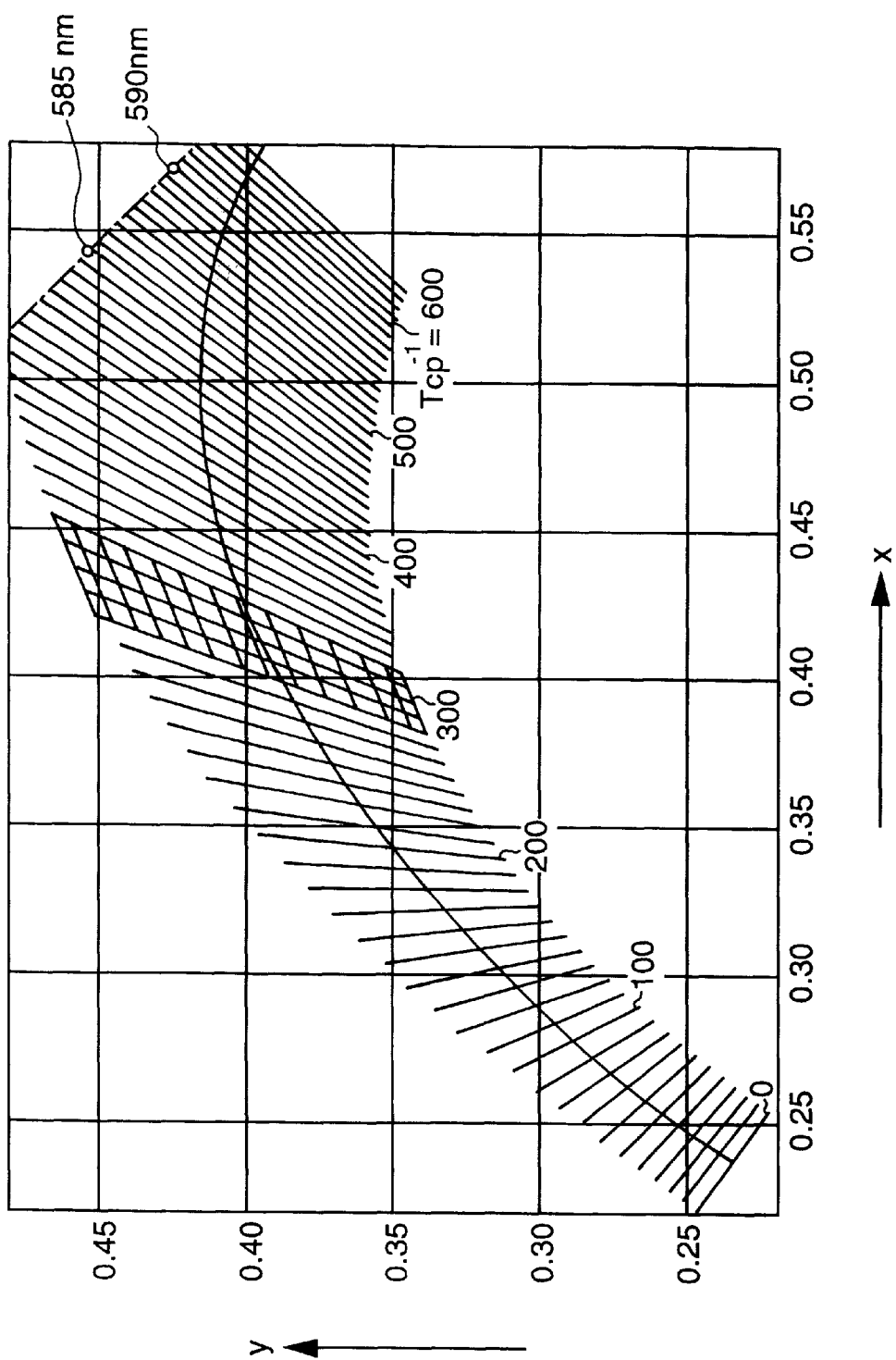
FIG. 9 shows an example of a chromaticity diagram.

When the above conditions are designated, the image sensing data selection designating unit 34 designates the correlated color temperature as the intrinsic information of image sensing data by using, e.g., a chromaticity diagram shown in FIG. 9.

Figure 1:
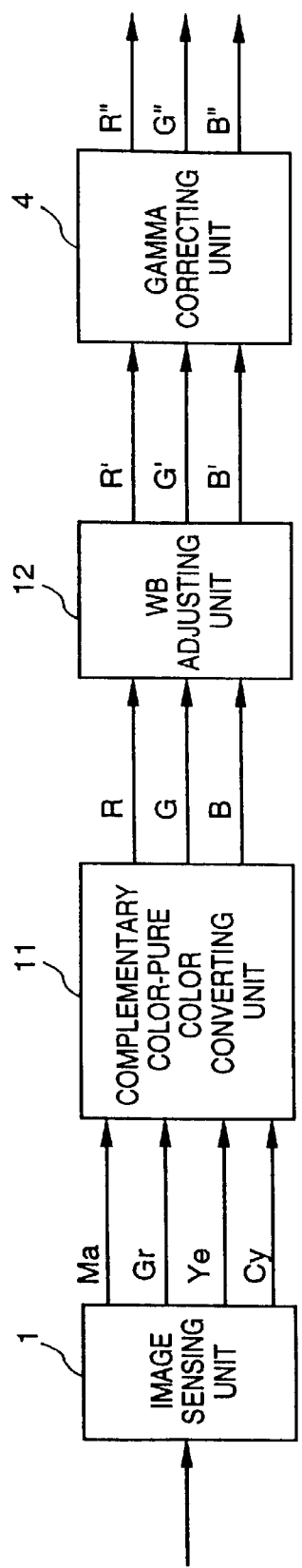
FIGS. 1 and 2 are block diagrams showing configurations for performing color temperature correction.
Figure 2:
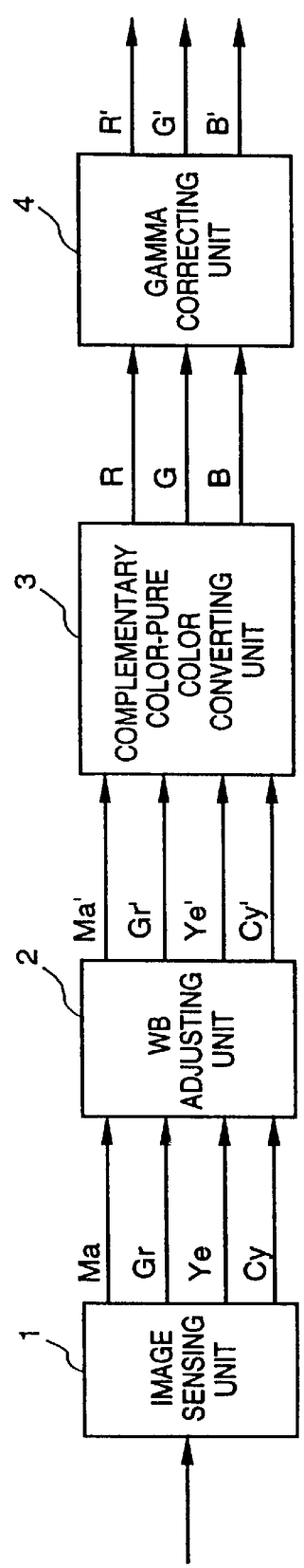

FIG. 9 is a graph shown as Appended FIG. 1 in JIS Z 8725 "Methods for Determining Distribution Temperature and Color Temperature or Correlated Color Temperature of Light Sources". In FIG. 9, a reciprocal correlated color temperature $T_{CP}^{-1}$ has the following relationship with a correlated color temperature $T_{CP}$:

$$T_{CP}(K) = \frac{10^6}{T_{CP}^{-1}(MK^{-1})} \quad (1)$$

The designated correlated color temperature is supplied to the image sensing data selecting unit 33 and used as the condition of grouping.

The image sensing data selecting unit 33 sequentially loads the image sensing data stored in the image data memory 20 (step S12), analyzes the image sensing data and extracts information pertaining to the color temperature (step S13), and checks whether the color temperature information satisfies the previously designated grouping condition (in this case the correlated color temperature) (step S14). If the color temperature information satisfies the condition, the image sensing data selecting unit 33 supplies the corresponding image sensing data to the image sensing data holding unit 31 (step S15).

Generally, the color temperature information obtained by analyzing the image sensing data is not a correlated color temperature itself but another signal having a one-to-one correspondence with the correlated color temperature. For example, when an image sensing device from which an R,G,B signal is obtained is used, it is possible to use, as the signal pertaining to the color temperature information, an (R/G,B/G) signal obtained by averaging image sensing data of one image plane or an (R/G,B/G) signal obtained as an average value of regions (which meet the condition that, e.g., their chromaticity values are within the range which defines the correlated color temperature in FIG. 9) sampled from image sensing data and corresponding to white. Since the (R/G,B/G) signal depends upon the sensitivity characteristic of the image sensing device used with respect to each color component, it is necessary to obtain the correspondence to the correlated color temperature by taking into account the characteristics of an image sensing device used as a system.

Figure 10:
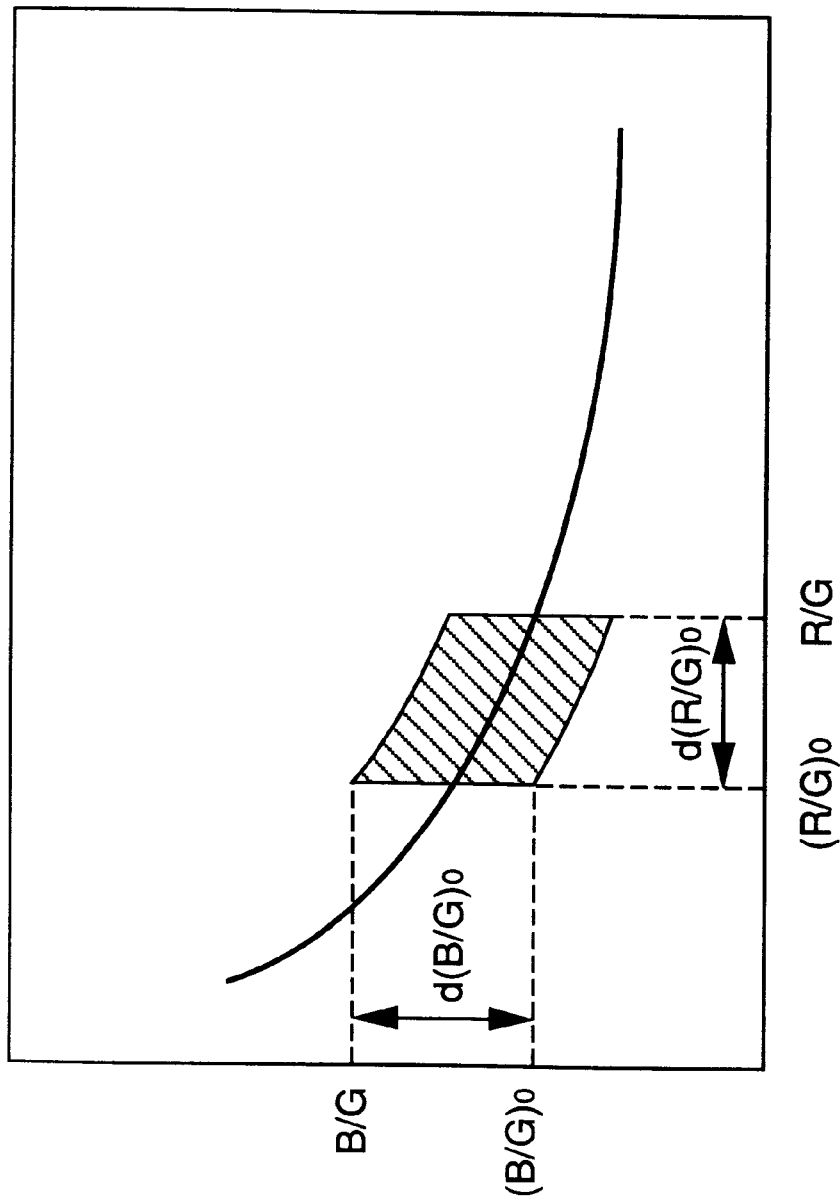
FIG. 10 is a view showing the range of a correlated color temperature of image sensing data represented by (R/G,B/G) signal values.

Since the characteristics of the (R/G,B/G) signals and the correlated color temperatures whose correspondence is thus obtained are in a one-to-one correspondence with each other, the relationship between the correlated color temperature (A(K)) and its selecting range color temperature (±dA(K)) which are the grouping conditions previously given can also be defined as follows by using the (R/G,B/G) signal. That is, the range of the correlated color temperatures of image sensing data to be grouped can be defined as A±dA(K), or, as illustrated in FIG. 10, ((R/G)$_0$±d(R/G)$_0$, (B/G)$_0$±d(B/G)$_0$). Accordingly, to directly check by using the (R/G,B/G) signal whether the grouping conditions are met, it is only necessary to check whether the color temperature information (R/G,B/G) obtained by analyzing the image sensing data is within the range of ((R/G)$_0$±d(R/G)$_0$, (B/G)$_0$±d(B/G)$_0$).

To make this determination by using the correlated color temperature, a correlated color temperature corresponding to the (R/G/,B/G) signal directly obtained from the image sensing data is obtained, and whether this correlated color temperature is within the range of A±dA(K) as the grouping condition is checked.

When a condition related to the color temperature information is given as the grouping condition, the above processing is sequentially executed for the image sensing data stored in the image data memory 20. It is determined that image sensing data meeting the grouping condition are image sensing data constituting the group. The image sensing data thus found to constitute the group are supplied to the image sensing data holding unit 31 (step S15) and held in it. The image sensing data selecting unit 33 repeats the processes from step S12 to step S15 until it is determined in step S16 that all of the image sensing data stored in the image data memory 20 are read out.

Grouping Using Composition of Object

Figure 11:
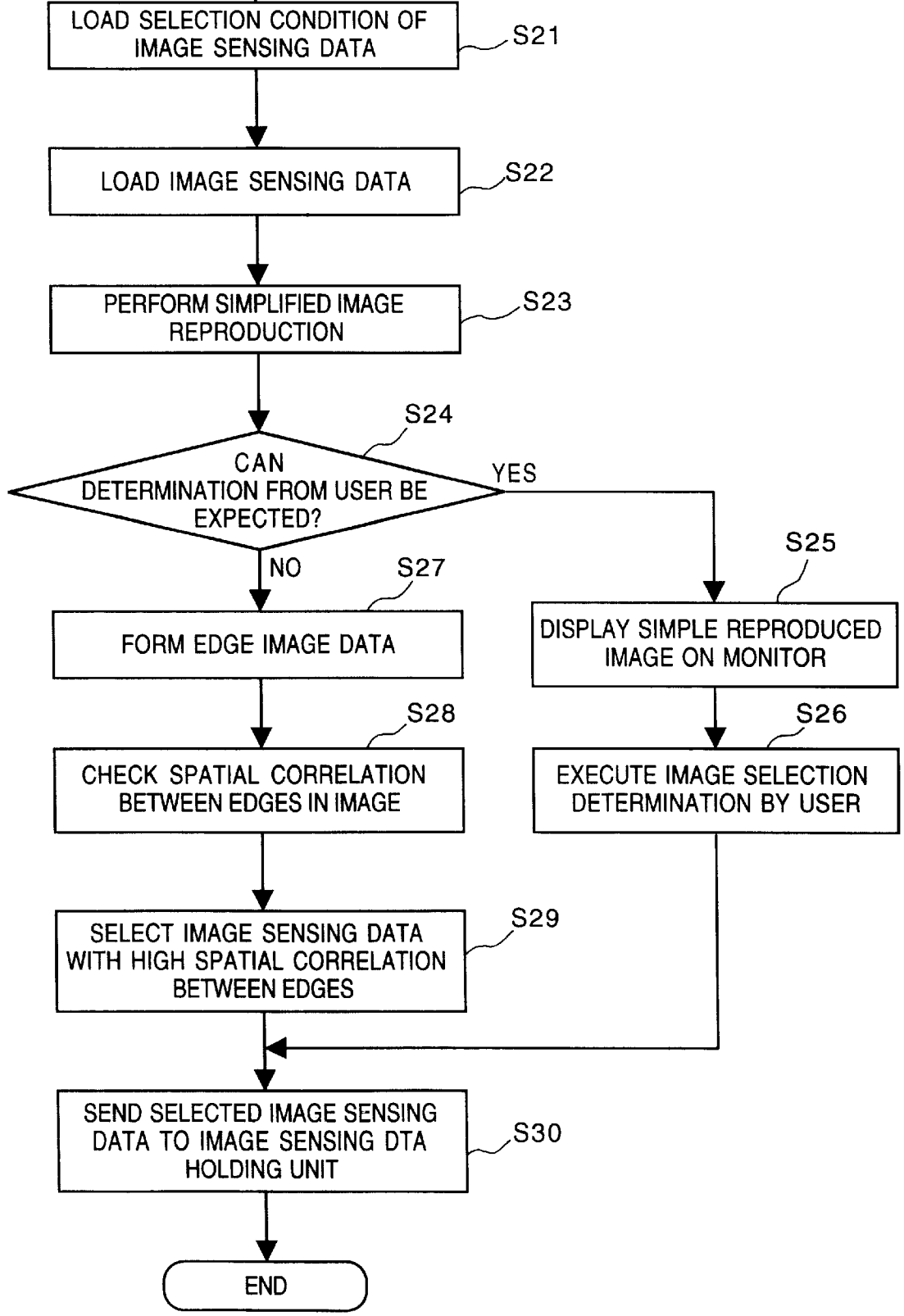
FIG. 11 is a flow chart showing image sensing data grouping processing when a composition is designated as the condition of grouping.

A method of grouping image sensing data when the composition of an object is designated as the condition of grouping will be described below. FIG. 11 is a flow chart showing the image sensing data grouping processing when the composition is designated as the grouping condition. This processing is executed by the control unit 36.

If the composition is designated as the grouping condition in step S21, the image sensing data selecting unit 33 loads the image sensing data stored in the image data memory 20 (step S22). The image reproduction processing unit 35 performs simplified reproduction to the extent to which the composition is known (step S23), thereby obtaining simple reproduced image data. The simplified reproduction can be reproduction processing to the extent to which the composition can be known. For example, pixels are thinned from image sensing data and luminance data is reproduced while the data amount is thus decreased.

Subsequently, the determination of grouping is performed by using the simple reproduced image data. However, it is generally efficient to subjectively determine, e.g., the similarity between images. Therefore, this subjective determination method is used in this embodiment. That is, if an instruction from the user can be expected in the determination of grouping, a series of simple reproduced image data are displayed on a monitor (steps S24 and S25), and the user selects images to be grouped from the image sensing data selection designating unit 34 (step S26). Image sensing data corresponding to the images selected by the user are sequentially supplied to the image sensing data holding unit 31 (step S30) and held in it.

To automatically determine grouping, edge image data is formed by extracting an edge component from simple reproduced image data (step S27), and the sameness or the similarity of the spatial relationship between edges is detected by applying an image processing technology (step S28). The spatial correlation is checked by analyzing the sameness or the similarity, and it is determined that images having a strong correlation are images meeting the grouping condition (step S29). Image sensing data corresponding to the images are supplied to the image sensing data holding unit 31 and held in it (step S30).

Grouping Using Appended information

Figure 12:
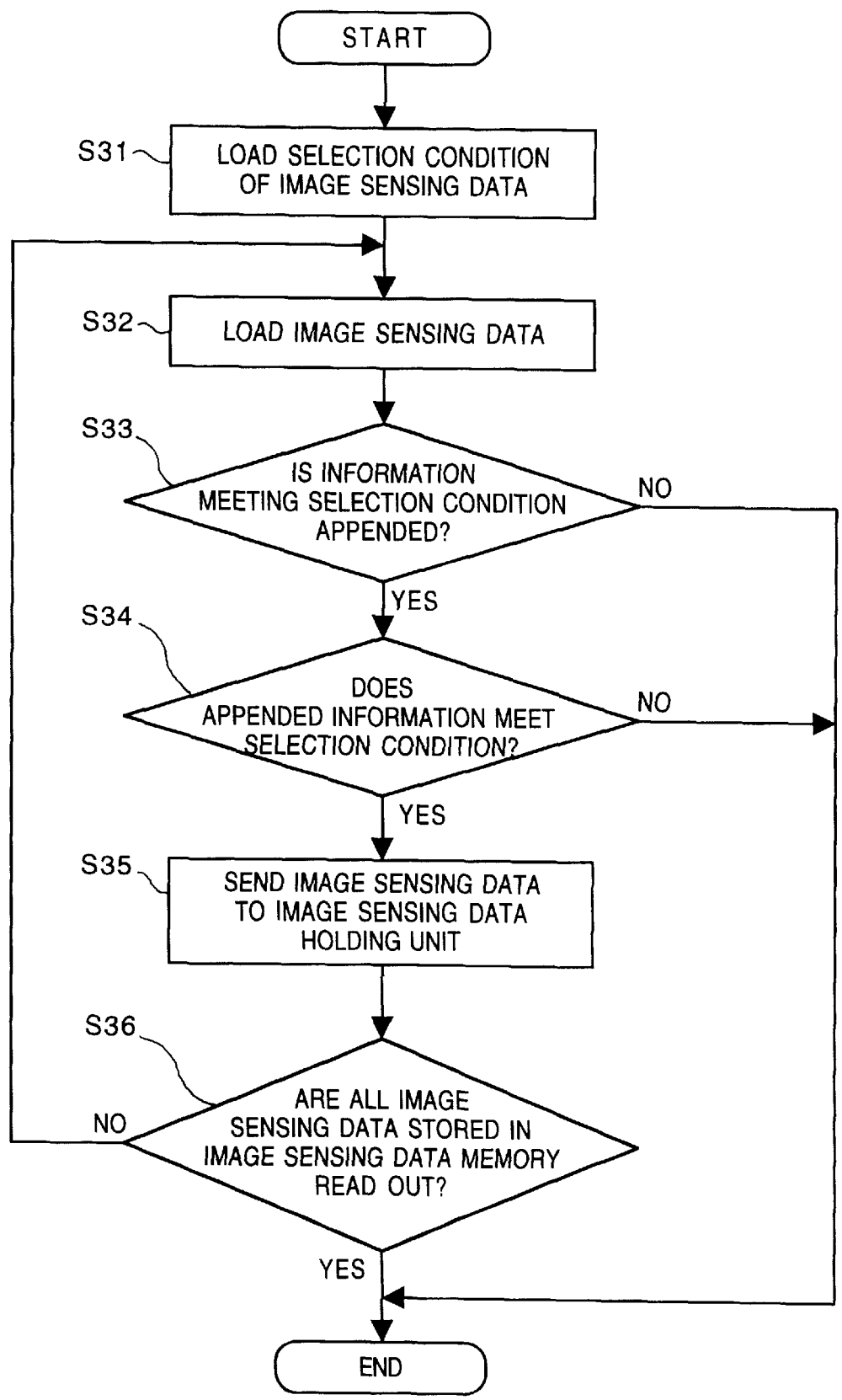
FIG. 12 is a flow chart showing processing of grouping image sensing data by using information appended to the image sensing data.

A method of grouping image sensing data by using information appended to the image sensing data will be described below. FIG. 12 is a flow chart showing the processing of grouping image data by using information appended to the image sensing data.

In step S31, information appended to image sensing data and the condition of the information are given as the conditions of group to the image sensing data selection designating unit 34. The image sensing data selecting unit 33 loads the image sensing data stored in the image data memory 20 (step S32), checks whether the information corresponding to the conditions is appended to the data (step S33), and sequentially loads image sensing data to which the information is appended (step S32). The image sensing data selecting unit 33 then checks whether the appended information meets the designated condition of selection for grouping (step S34).

If information such as the photographing time, the EV value, the aperture value, the object distance, or the shutter speed whose range can be numerically set is used, the grouping selection condition is whether the value of the appended information falls within the numerically indicated range. If information such as the image sensing mode, the photographing place, the use/nonuse of an electronic flash, or the use/nonuse of an optical low-pass filter which is difficult to numerically indicate is used, the agreement between the names of the places, the names of the modes, or the states of the use/nonuse is the condition. If grouping information (the same mark is given to image sensing data obtained in the same place) depending on the image sensing mode is given as appended information, the agreement between the given marks is the condition. Image sensing data meeting the grouping selection condition are sequentially supplied to the image sensing data holding unit 31 (step S35) and held in it. The image sensing data selecting unit 33 repeats the processes from step S32 to S35 until it is determined in step S36 that all of the image sensing data stored in the image data memory 20 are loaded.

Grouping in Image Synthesis

A method of grouping image sensing data when a synthetic image is to be obtained by increasing the dynamic range as disclosed in Japanese Patent Laid-Open No.7-131796 or a synthetic image is to be obtained by a method of panorama image synthesis for obtaining a wide-angle image from a plurality of image sensing data as disclosed in Japanese Patent Laid-Open No. 5-183789 will be described below.

In a case like this, it is desirable that appended information indicating that data is image sensing data for obtaining a certain synthetic image be given to the data during photography. If this is the case, in this embodiment image sensing data constituting an image sensing data group are selected and grouped on the basis of the appended information. Alternatively, as explained in "Grouping Using Composition of Object", it is also possible to simply reproduce image sensing data, perform grouping determination, and group the image sensing data. In processing for obtaining a synthetic image, all image sensing data stored in the image data memory 20 are in some cases previously selected as image sensing data to be processed as a group when the processing is executed. If this is the case, in this embodiment, the image reproduction is performed by processing all of the image sensing data stored in the image data memory 20 as a group of image sensing data.

In this embodiment as described above, when image sensing data is converted into image data, a plurality of image sensing data meeting predetermined conditions are processed as a group of image sensing data, and an image reproduction parameter is obtained from this image sensing data group. The image sensing data belonging to the image sensing data group can be converted into image data by using this image reproduction parameter.

In this embodiment, therefore, when an image reproduction parameter such as a white balance coefficient is determined from image sensing data in order to obtain an optimum reproduced image, this image reproduction parameter can be accurately set. Also, since a reproduction luminance level (range) is determined from a group of image sensing data, the correlation between the luminances of a plurality of image planes is not lost. This makes the comparison of reproduced images possible and prevents the connection of luminances from becoming unnatural when these reproduced images are synthesized.

<Second Embodiment>

As described above, various image reproduction parameters used to obtain an optimum reproduced image in image reproduction processing may be associated with each other via a certain photographing light source. In this case, the association between these image reproduction parameters is fully utilized, i.e., one parameter is obtained by using information that another parameter has. Consequently, the image reproduction processing can be efficiently and accurately performed. This embodiment realizes this processing.

Figure 13:
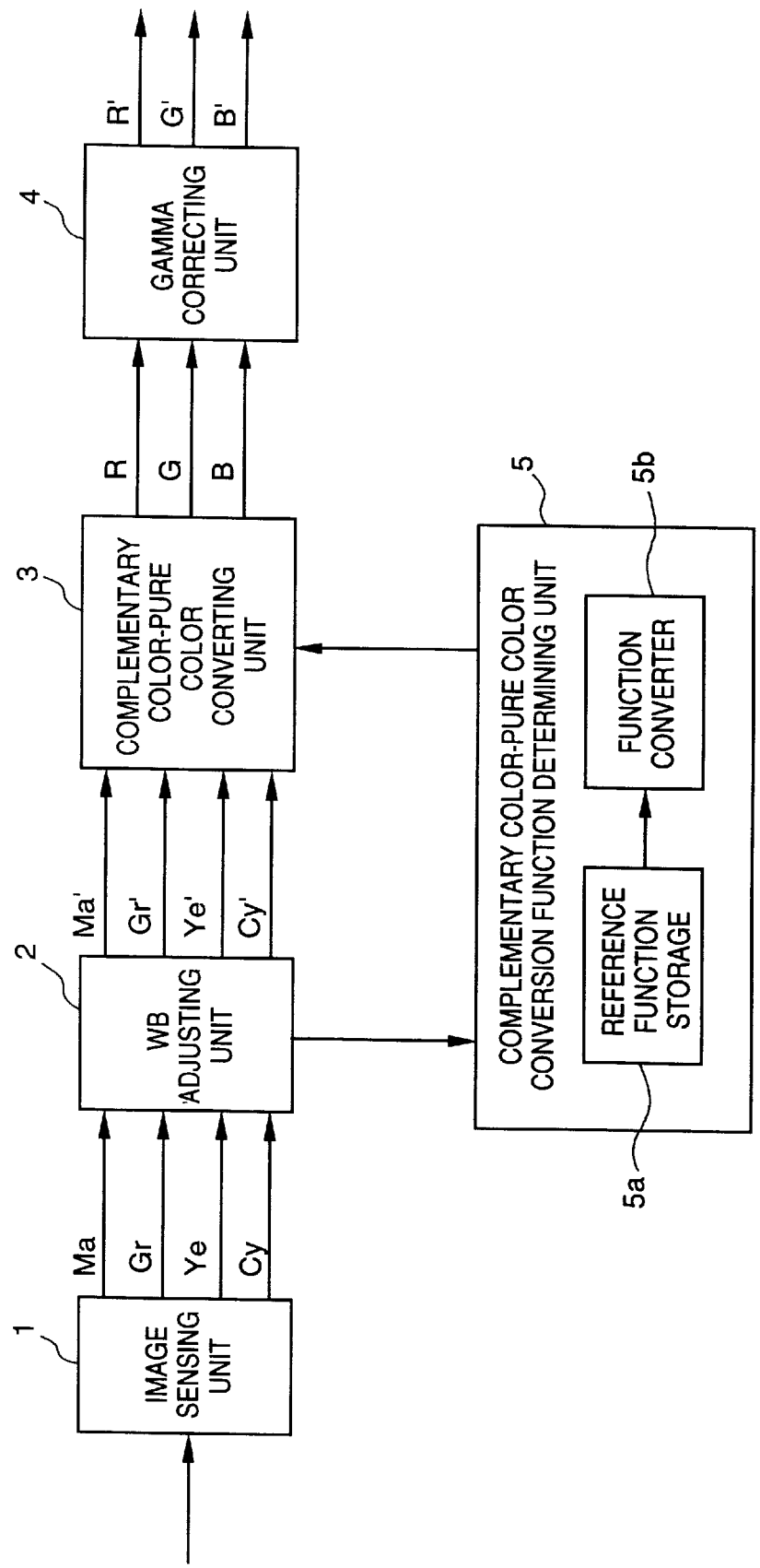
FIG. 13 is a schematic block diagram showing the overall configuration of a color image reproducing apparatus according to the second embodiment.

FIG. 13 is a schematic block diagram showing the overall configuration of a color image reproducing apparatus using a single-sensor color camera which uses a complementary color imager as an image sensing device.

Usually, a color image reproducing apparatus performs various processes necessary to reproduce color images. Therefore, a color image reproducing apparatus requires components for performing processes not clearly illustrated in FIG. 13. Although these components are necessary in this embodiment, FIG. 13 shows minimum necessary components for explaining the processing and the configuration related to this embodiment.

The color image reproducing apparatus shown in FIG. 13 comprises an image sensing unit 1, a white balance (WB) adjusting unit 2, a complementary color-pure color converting unit 3, a gamma correcting unit 4, and a complementary color-pure color conversion function determining unit (to be referred to as a "conversion function determining unit" hereinafter) 5. This conversion function determining unit 5 has a reference function storage 5a and a function converter 5b.

The image sensing unit 1 is, e.g., a single-sensor color camera using a complementary color imager. The image sensing unit 1 senses the image of an object (not shown) and outputs two-dimensional digital data consisting of four different color components, magenta Ma, green Gr, Yellow Ye, and cyan Cy, in accordance with complementary color filters of these colors, as the image sensing data of the object.

By using the two-dimensional digital data output from the image sensing unit 1, the WB adjusting unit 2 extracts photographing light source information (e.g., color temperature information or color component signals (Ma,Cr,Ye,Cy) corresponding to the photographing light source) and, on the basis of the photographing light source information, obtains so-called white balance coefficients. The white balance is adjusted by adjusting the gains of these color component signals (Ma,Gr,Ye,Cy) by using the white balance coefficients.

Assuming that the white balance coefficients are ($K_{Ma}$, $G_{Gr}$, $K_{Ye}$, $K_{Cy}$), complementary color data (Ma',Gr',Ye',Cy') after the white balance adjustment are represented by $$\left. \begin{array}{l} Ma' = K_{Ma} \cdot Ma \\ Gr' = K_{Gr} \cdot Gr \\ Ye' = K_{Ye} \cdot Ye \\ Cy' = K_{Cy} \cdot Cy \end{array} \right\} \quad (2)$$

The complementary color-pure color converting unit 3 performs color space conversion for the complementary color data (Ma',Gr',Ye',Cy') whose white balance is adjusted by the WB adjusting unit 2, thereby obtaining pure color data (R,G,B) as a reproduction image signal. As an example, this complementary color-pure color converting unit 3 converts the complementary color data (Ma',Gr',Ye',Cy') after the white balance adjustment into NTSC-RGB data.

Generally, the conversion from the complementary color data (Ma',Gr',Ye',Cy') into the pure color data (R,G,B) is performed on the basis of functions $f_R$, $f_G$, and $f_B$ (to be collectively referred to as a function f hereinafter unless it is necessary to distinguish between them). That is, $$\left. \begin{array}{l} R = f_R(Ma', Gr', Ye', Cy') \\ G = f_G(Ma', Gr', Ye', Cy') \\ B = f_B(Ma', Gr', Ye', Cy') \end{array} \right\} \quad (3)$$

This function f is described by using a matrix or a lookup table (LUT).

In order to optimally display and record images, the gamma correcting unit 4 corrects the pure color data (R,G,B), which constitute the reproduction image signal obtained by the complementary color-pure color converting unit 3, by using the characteristics of an image displaying recording apparatus (not shown), and outputs the corrected component signals (R',G',B') as a display recording signal.

By using the photographing light source information or the white balance coefficients as more practical parameters obtained by the WB adjusting unit 2, the conversion function determining unit 5 obtains the complementary color-pure color conversion function (to be referred to as a "conversion function" hereinafter) f to be used in the complementary color-pure color converting unit 3. The conversion function f obtained by the conversion function determining unit 5 is supplied to the complementary color-pure color converting unit 3. On the basis of the supplied conversion function f, the complementary color-pure color converting unit 3 converts the complementary color data (Ma',Gr',Ye',Cy') into the pure color data (R,G,B).

The color image reproducing apparatus with the above configuration primarily has its characteristic features in the configurations and processes of the WB adjusting unit 2, the complementary color-pure color converting unit 3, and the conversion function determining unit 5. That is, the color image reproducing apparatus of this embodiment comprises the conversion function determining unit 5 for obtaining the conversion function f used by the complementary color-pure color converting unit 3 to convert the complementary color data (Ma',Gr',Ye',Cy') into the pure color data (R,G,B). The color image reproducing apparatus of this embodiment is characterized in that this conversion function determining unit 5 receives the photographing light source information or the white balance coefficients obtained by the WB adjusting unit 2 and obtains the conversion function f on the basis of the received information.

This characteristic feature will be described in detail below. Assume that a conversion function (daylight conversion functions $f_{R,D65}$, $f_{G,D65}$ and $f_{B,D65}$; to be collectively referred to as $f_{D65}$ hereinafter) which is optimally set on the basis of daylight (e.g., a D65 light source described by JIS) is previously stored as a reference conversion function in the reference function storage 5a of the conversion function determining unit 5.

The WB adjusting unit 2 extracts photographing light source information from image sensing data and obtains white balance coefficients for adjusting the gains of color component signals (Ma,Gr,Ye,Cy) on the basis of the light source information. The WB adjusting unit 2 performs white balance adjustment by balancing the color component signals (Ma,Gr,Ye,Cy) by using the white balance coefficients. Consequently, a change in the photographing light source is compensated for.

The photographing light source information and the white balance coefficients obtained when this white balance adjustment is performed are supplied to the conversion function determining unit 5. On the basis of the photographing light source information and the white balance coefficients ($K_{Ma}$, $K_{Cr}$, $K_{Ye}$, $K_{Cy}$) supplied from the WB adjusting unit 2, the function converter 5b of the conversion function determining unit 5 alters the reference conversion function $f_{D65}$ and obtains the conversion function f corresponding to the white balance coefficients ($K_{Ma}$, $K_{Cr}$, $K_{Ye}$, $K_{Cy}$). Note that the procedure of this alteration is previously described.

For example, assume that the alteration procedure is given as follows:

$$\left. \begin{array}{l} f_{R(Ma',Gr',Ye',Cy')} = f_{R,D65}(Ma', Gr', Ye', Cy', K_{Ma}, K_{Gr}, K_{Ye}, K_{Cy}) \\ f_{G(Ma',Gr',Ye',Cy')} = f_{G,D65}(Ma', Gr', Ye', Cy', K_{Ma}, K_{Gr}, K_{Ye}, K_{Cy}) \\ f_{B(Ma',Gr',Ye',Cy')} = f_{B,D65}(Ma', Gr', Ye', Cy', K_{Ma}, K_{Gr}, K_{Ye}, K_{Cy}) \end{array} \right\} \quad (4)$$

When arbitrary white balance coefficients ($K_{Ma}$, $K_{Cr}$, $K_{Ye}$, $K_{Cy}$) are supplied, the conversion function f is uniquely determined in accordance with the white balance coefficients.

The conversion function f obtained by the conversion function determining unit 5 in accordance with the photographing light source as described above is supplied to the complementary color-pure color converting unit 3. The conversion function f is used by the complementary color-pure color converting unit 3 in the processing of converting the complementary color data (Ma',Gr',Ye',Cy') into the pure color data (R,G,B).

<Third Embodiment>

Figure 14:
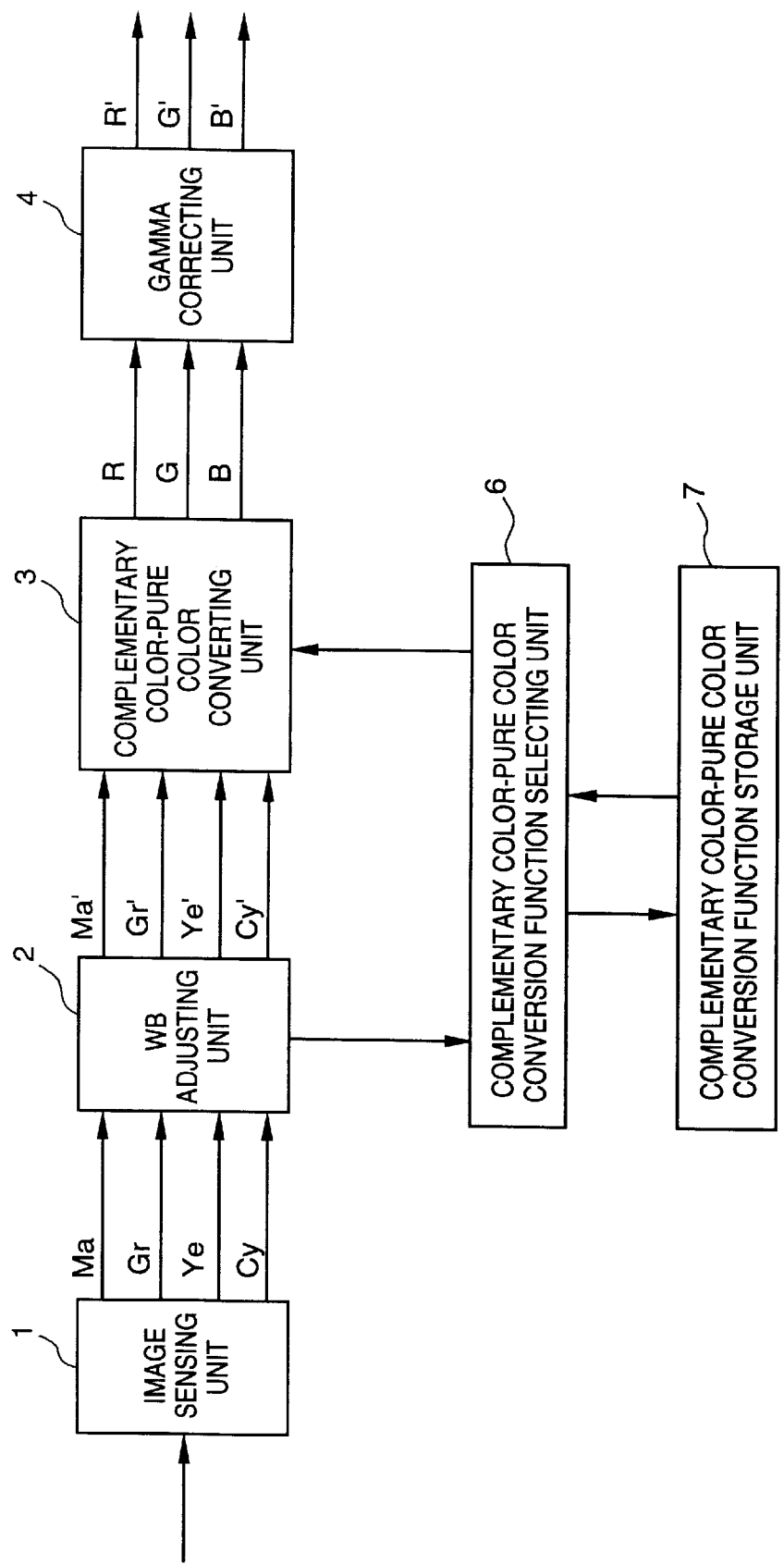
FIG. 14 is a schematic block diagram showing the overall configuration of a color image reproducing apparatus according to the third embodiment.

FIG. 14 is a schematic block diagram showing the overall configuration of a color image reproducing apparatus according to the third embodiment. Note that the same reference numerals as in the color image reproducing apparatus shown in FIG. 13 denote parts having the same functions in FIG. 14, and a detailed description thereof will be omitted.

The color image reproducing apparatus of this third embodiment primarily has its characteristic features in the configurations and processes of a WB adjusting unit 2, a complementary color-pure color converting unit 3, a complementary color-pure color conversion function selecting unit (to be referred to as a "conversion function selecting unit" hereinafter) 6, and a complementary color-pure color conversion function storage unit (to be referred to as a "conversion function storage unit" hereinafter) 7.

That is, in the color image reproducing apparatus of this embodiment, conversion functions f used in the complementary color-pure color converting unit 3 to convert complementary color data (Ma',Gr',Ye',Cy') into pure color data (R,G,B) are previously obtained for several photographing light sources. The apparatus comprises the conversion function storage unit 7 for storing and holding these conversion functions f and the conversion function selecting unit 6 for selecting one of the conversion functions f stored in the conversion function storage unit 7.

The apparatus of this embodiment is characterized in that the conversion function selecting unit 6 receives photographing light source information or white balance coefficients from the WB adjusting unit 2 and selects a proper conversion function f from the conversion function storage unit 7 on the basis of the information.

That is, in this embodiment, a plurality of conversion functions f are prepared for several predicted photographing light sources and stored in the conversion function storage unit 7. The conversion function selecting unit 6 analyzes the photographing light source information or the white balance coefficients obtained by the WB adjusting unit 2, selects a conversion function f corresponding to the photographing light source from the conversion function storage unit 7, and supplies the selected conversion function f to the complementary color-pure color converting unit 3.

In this third embodiment, it is unnecessary to alter the conversion function such as done in the conversion function determining unit 5 of the second embodiment. That is, it is only necessary to select an appropriate conversion function f from the conversion function storage 7. Consequently, the processing can be performed at a higher speed than in the second embodiment.

<Fourth Embodiment>

Figure 15:
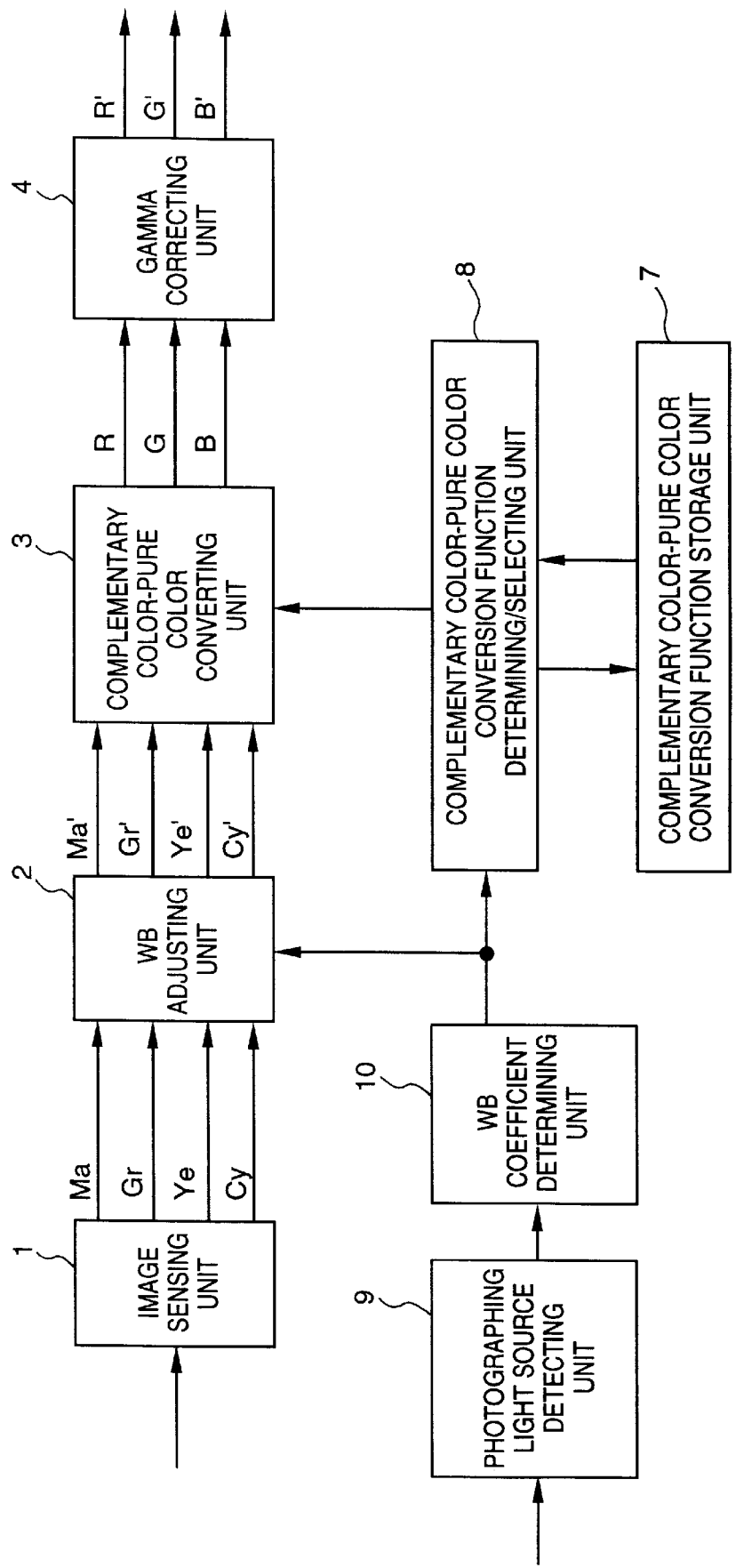
FIG. 15 is a schematic block diagram showing the overall configuration of a color image reproducing apparatus according to the fourth embodiment.

The fourth embodiment of the present invention will be described below. FIG. 15 is a block diagram showing an outline of the overall configuration of a color image reproducing apparatus according to the fourth embodiment. In the second and third embodiments described above, photographing light source information is obtained from image sensing data from the image sensing unit 1. However, in this fourth embodiment, the photographing light source information is directly obtained from a light source used in photography.

That is, as illustrated in FIG. 15, the color image reproducing apparatus of this embodiment comprises a photographing light source detecting unit 9 and a WB coefficient determining unit 10. In this configuration, the photographing light source detecting unit 9 detects photographing light source information with respect to image sensing data output from an image sensing unit 1. The WB coefficient determining unit 10 determines a white balance coefficient on the basis of the detected photographing light source information. The WB coefficient determining unit 10 supplies the white balance coefficient thus determined to a WB adjusting unit 2 and a complementary color-pure color conversion function determining-selecting unit (to be referred to as a "conversion function determining-selecting unit" hereinafter) 8.

On the basis of the supplied white balance coefficient, the WB adjusting unit 2 adjusts the white balance, and the conversion function determining-selecting unit 8 calculates or selects a conversion function f corresponding to the photographing light source. This processing of calculating the conversion function f is performed in the same manner as in the second embodiment. The processing of selecting the conversion function f is performed in the same way as in the third embodiment.

The conversion function f thus calculated or selected by the conversion function determining selecting unit 8 is supplied to a complementary color-pure color converting unit 3 where the function is used in complementary color-pure color conversion.

In addition to the configuration shown in FIG. 15 in which both the photographing light source detecting unit 9 and the image sensing unit 1 are juxtaposed in the apparatus and the photographing light source is constantly detected, there can be a configuration where the image sensing unit 1 is separately arranged and supplies image sensing data to the apparatus by some means. In this case, if information of the photographing light source is added to the image sensing data, the photographing light source detecting unit 9 detects photographing light source information from the additional data.

The rest of the configuration and operation of the image reproducing apparatus according to the fourth embodiment shown in FIG. 15 is almost the same as the configurations and operations of the second and third embodiments described above, and so a detailed description thereof will be omitted.

In the second to fourth embodiments as described above, a complementary color-pure color conversion function as one of a plurality of image reproduction parameters constituting an image reproduction parameter group is calculated or selected on the basis of a white balance coefficient as another image reproduction parameter. Therefore, the white balance and the complementary color pure color conversion function associated with the white balance can be efficiently and accurately set without producing any contradiction between them. Consequently, images can be properly reproduced in accordance with the photographing light source.

The principal object of these embodiment is to calculate or select a certain image reproduction parameter from another relevant image reproduction parameter, thereby accurately reproducing images. Examples of image reproduction parameters constituting an image reproduction parameter group are a color temperature, a white balance coefficient, a color component gain, white point information, black point information, a gamma coefficient, a gradation characteristic, a gradation conversion curve, a gradation conversion lookup table, a knee point, a dynamic range, a color gamut, light source information, a color coordinate conversion matrix coefficient, a spatial frequency characteristic, a black (gray) balance coefficient, an S/N ratio, an auto-correlation coefficient, a Wiener spectrum, an intensity (density) distribution, and a luminance distribution, and parameters obtained directly or indirectly from these information.

In the second to fourth embodiments as described above, at least one of a plurality of different image reproduction parameters used in the conversion from an image sensing signal to an image signal is obtained from at least another image reproduction parameter. Accordingly, it is possible to avoid the inconveniences, when these image reproduction parameters are individually determined, that a contradiction occurs between correlated image reproduction parameters and parameters are determined inefficiently. Consequently, image sensing signals can be converted into image signals by using an image reproduction parameter group consisting of more accurate image reproduction parameters corresponding to the condition of the photographing light source. This makes accurate and desired image reproduction feasible.

<Fifth Embodiment>
[Structure]

Figure 16:
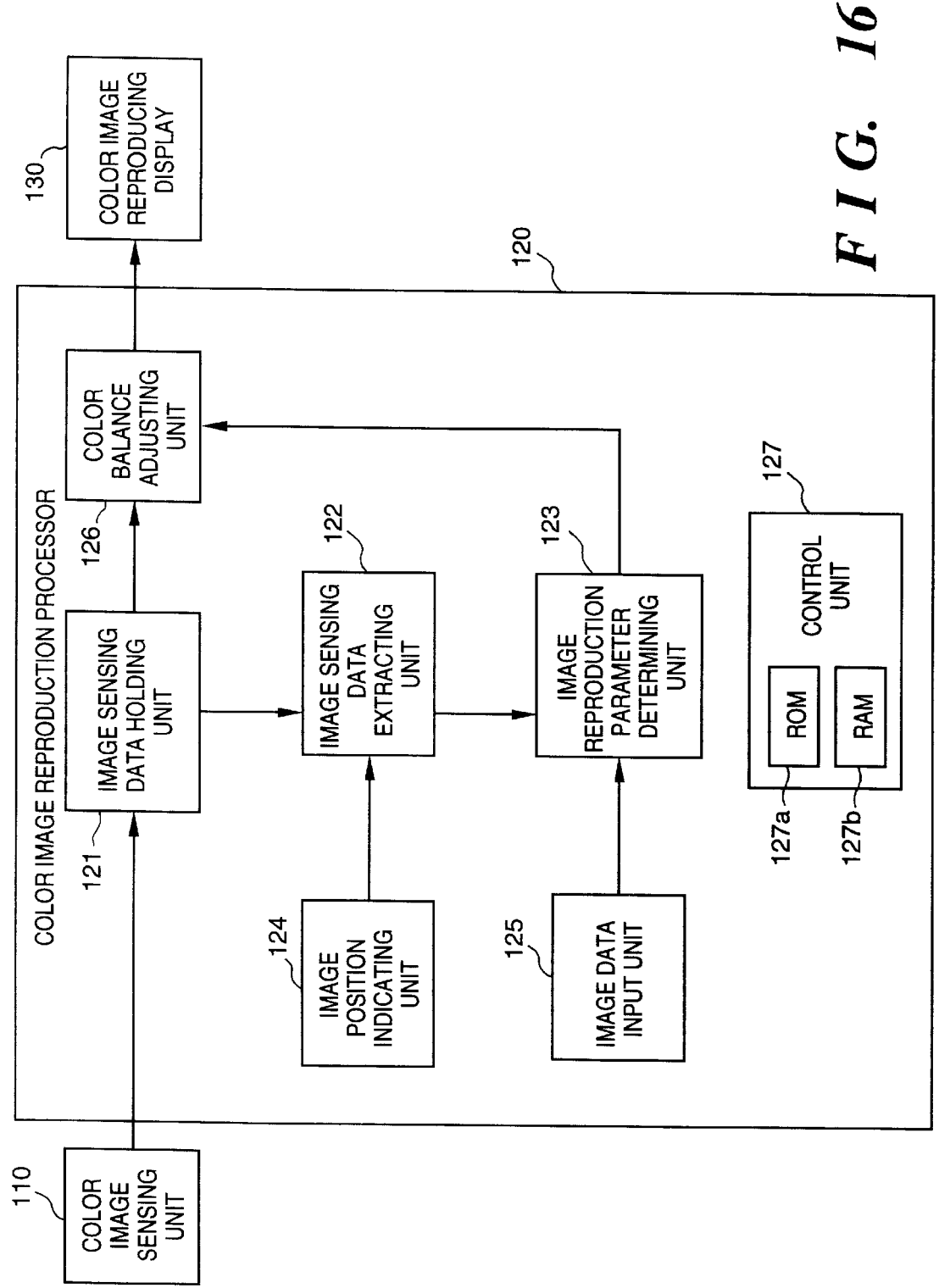
FIG. 16 is a block diagram showing the configuration of an image processing apparatus according to the fifth embodiment.

FIG. 16 is a block diagram showing the constitution of an image processing apparatus of the fifth embodiment.

Referring to FIG. 16, a color image sensing unit 110 is, e.g., a digital camera including an image sensing device such as an image sensing tube or a CCD. The color image sensing unit 110 senses the image of an object and outputs two-dimensional digital data as the image sensing data of the object. A color image reproduction processor 120 performs image reproduction processing for the output two-dimensional digital data from the color image sensing unit 110. For example, the color image reproduction processor 120 converts the two-dimensional digital data into digital NTSC-RGB data and outputs the converted data. A color image reproducing display 130 consists of, e.g., a color video card and a monitor. The color image reproducing display 130 receives the output color image signal from the color image reproduction processor 120 and displays the color image on the monitor.

Although not shown in FIG. 16, the apparatus of this embodiment can be connected to a printer which receives the output color image signal from the color image reproduction processor 120 and records the color image on a recording medium. The apparatus can also be connected to an image storage device or a personal computer as well as to a printer.

The color image reproduction processor 120 performs various processes necessary for color image reproduction. In the following description, processing of color balance adjustment performed by the color image reproduction processor 120 and the configuration for the processing will be explained. Normal color image reproduction requires various processes and components not clearly explained and illustrated in the drawings. However, these processes and components are well known to those skilled in the art, so a detailed description thereof will be omitted.

The color image reproduction processor 120 includes the following components. That is, an image sensing data holding unit 121 holds the output digital image sensing data from the color image sensing unit 110. An image sensing data extracting unit 122 extracts a portion of the image sensing data. An image position indicating unit 124 indicates an image position of the image sensing data to be extracted by the image sensing data extracting unit 122.

An image data input unit 125 inputs data that the image data in the indicated position finally takes. An image reproduction parameter determining unit 123 determines an image reproduction parameter by using the input image data from the image data input unit 125 and the image sensing data extracted by the image sensing data extracting unit 122. A color balance adjusting unit 126 adjusts the color balance of the image sensing data, when an image is reproduced, by using the image reproduction parameter determined by the image reproduction parameter determining unit 123.

A control unit 127 consists of, e.g., a CPU, a program ROM 127a, a work RAM 127b, and an I/O device. The control unit 127 executes the color image reproduction processing by controlling the above components and components not shown in FIG. 16.

[Operation]

Figure 17:
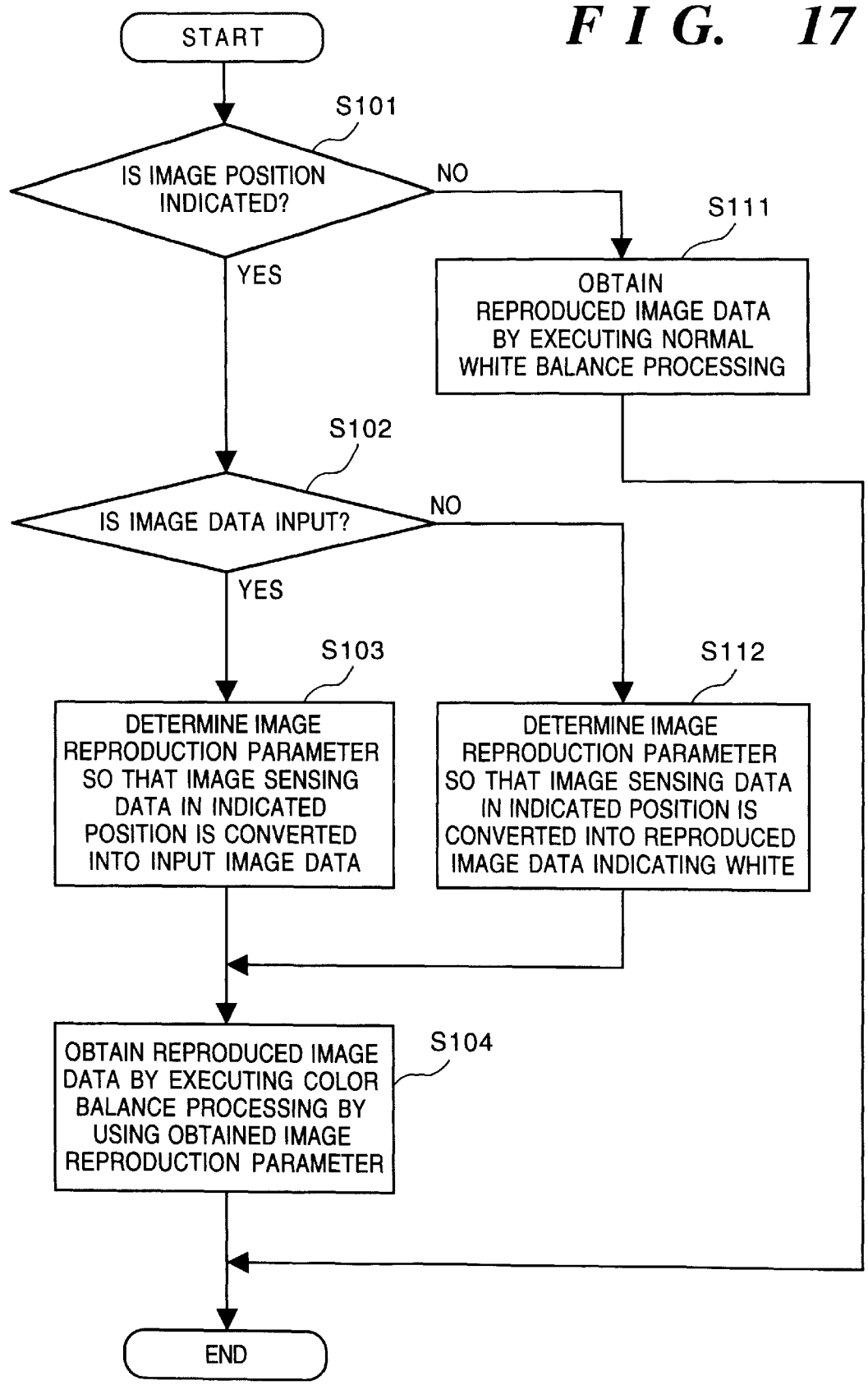
FIG. 17 is a flow chart showing the operation of a color image reproduction processor shown in FIG. 16.

The operation of this embodiment will be described below. FIG. 17 is a flow chart showing the operation of the color image reproduction processor 120, and particularly the procedure of color balance adjustment. This procedure is started by the control unit 127 when the input digital image sensing data from the color image sensing unit 110 is held in the image sensing data holding unit 121.

In step S101, the control unit 127 checks whether an image position is indicated by the image position indicating unit 124. If no image position is indicated, the flow advances to step S111, and the control unit 127 allows the color balance adjusting unit 126 to perform normal white balance processing for the image sensing data held in the image sensing data holding unit 121, thereby obtaining reproduced image data. Thereafter, the control unit 127 completes the processing. On the other hand, if an image position is indicated, the control unit 127 sends the indicated image position (to be referred to as an "indicated position" hereinafter) to the image sensing data extracting unit 122, and the flow advances to step S102. In step S102, the control unit 127 checks whether the image data input unit 125 inputs image data.

An example of the white balance processing usually performed will be described below. Note that this white balance processing is done on the basis of image sensing data. To perform the white balance processing, it is necessary to extract light source information from image sensing data. Generally, the color balance is adjusted on the basis of the extracted light source information, and the white balance processing is performed such that the color of the light source becomes white. Accordingly, if the light source information is not correctly extracted, incorrect white balance processing is performed.

An example of the method of extracting the light source information from image sensing data is as follows. It is generally considered that in an image sensed by using reflected light from an object, a region (white region) having the light source information has a high luminance. Therefore, each color data in a region having the highest luminance in image sensing data is used as the light source information. This method is effective when all regions in image sensing data are obtained by using reflected light from an object and a white region is contained in the image. However, if an image has no white region or a luminescent body is included in the image, a region having a high luminance may not necessarily have the light source information. If this is the case, it is sometimes not possible to accurately extract the light source information.

A method other than the above method is to obtain the light source information by calculating the average of image sensing data, i.e., all pixels, constituting an image, for each color. This method is useful when all colors in an image are evenly present with no difference between them. Generally, however, a large amount of a certain specific color component often exists, and in this case it is not possible to accurately obtain the light source information.

It is known that common light sources excluding some special light sources exist in a certain chromaticity range. If the characteristics of a color filter used in photography are known, the range of the existence of image sensing data having the light source information can be set from the above relationship. Accordingly, image sensing data can be extracted more accurately by sampling image sensing data in this range of existence from image sensing data constituting an image.

More specifically, assume that color data obtained as image sensing data are (Ma,Gr,Ye,Cy). These data are normalized by the following equations:

$$\left. \begin{array}{l} Kmg = (Mg - Gr)/Gr \\ Kyc = (Ye - Cy)/Cy \end{array} \right\} \quad (5)$$

With respect to the light source, Kmg and Kyc fall within a certain range in accordance with the above relations. Therefore, data (Ma,Gr,Ye,Cr) in this range are stored as data of the light source information and averaged (i.e., the total sum of each color data of image sensing data meeting the condition is divided by the total number of sampling cycles). In this way, the light source information can be accurately obtained.

The above method is performed singly, or in combination with another, as the white balance processing, and particularly as the method of extracting the light source information in the white balance processing.

If no image data is input in step S102, the flow advances to step S112. In step S112, the image sensing data extracting unit 122 extracts image sensing data corresponding to the indicated position and supplies the extracted image sensing data (to be referred to as "extracted data" hereinafter) to the image reproduction parameter determining unit 123. Upon receiving the extracted data, the image reproduction parameter determining unit 123 determines an image reproduction parameter by using the extracted data such that the reproduced image data in the indicated position becomes image data indicating white. The image reproduction parameter determining unit 123 supplies the determined image reproduction parameter to the color balance adjusting unit 126.

On the other hand, if image data is input by the image data input unit 125, this image data (to be referred to as "designated data" hereinafter) is supplied to the image reproduction parameter determining unit 123, and the flow advances to step S103. In step S103, the image sensing data extracting unit 122 extracts image sensing data corresponding to the indicated position and supplies the extracted data to the image reproduction parameter determining unit 123. Upon receiving the designated data and the extracted data, the image reproduction parameter determining unit 123 determines an image reproduction parameter by using the designated data and the extracted data such that the reproduced image data in the indicated position becomes the designated data. The image reproduction parameter determining unit 123 supplies the determined image reproduction parameter to the color balance adjusting unit 126.

In step S104, the color balance adjusting unit 126 adjusts the color balance of the image sensing data held in the image sensing data holding unit 121 by using the image reproduction parameter obtained in step S103 or S112, thereby obtaining reproduced image data. Thereafter, the control unit 127 completes the processing.

The reproduced image data thus obtained is supplied to the color image reproducing display 130 which in turn reproduces and displays the color image.

In the above procedure, the coordinate positions of image sensing data on a two-dimensional plane and the coordinate positions of a reproduced image obtained by performing image reproduction processing for the image sensing data are indicated, and the reproduced image data (indicated data) in this indicated position is supplied. Consequently, an image reproduction parameter is automatically determined on the basis of the image sensing data and the indicated data in this indicated position. Image reproduction processing is performed by using the image reproduction parameter thus determined. Accordingly, a reproduced image whose color balance is properly adjusted can be obtained with a simple operation.

In particular, this embodiment is not limited to the color balance adjustment (white balance adjustment) based on white; that is, the color balance can be adjusted by using any arbitrary color. Therefore, objects applicable to the color balance adjustment are not limited, i.e., any arbitrary object can be selected.

[Determination of Image Reproduction Parameters]

One example of the method of automatically determining an image reproduction parameter will be described below.

Assume that image sensing data in a certain indicated position is obtained as (Mg,Gr,Cy,Ye) from the output of an image sensing device and image reproduction data (R,G,B) is obtained by performing the following conversion for the image sensing data (Mg,Gr,Cy,Ye).

$$\begin{bmatrix} R \\ G \\ B \end{bmatrix} = \begin{bmatrix} a11 & a12 & a13 & a14 \\ a21 & a22 & a23 & a24 \\ a31 & a32 & a33 & a34 \end{bmatrix} \begin{bmatrix} k1 \cdot Mg \\ k2 \cdot Gr \\ k3 \cdot Cy \\ k4 \cdot Ye \end{bmatrix} \quad (6)$$

In the above equation, k1, k2, k3, and k4 are parameters for color balance adjustment, i.e., color balance adjustment gains in the data Mg, Gr, Cy, and Ye. Commonly, the default values of all these parameters are 1, and all, a12, . . . , a34 are conversion matrix coefficients for converting (Mg,Gr, Cy,Ye) into (R,G,B). These conversion matrix coefficients are normally determined on the basis of the spectral sensitivity characteristics of an image sensing device used in photography or the characteristics of a colorimetric system used as an output image signal, and are generally fixed after being set.

Commonly, the color balance adjustment is done by using the parameters k1, k2, k3, and k4. For example, assuming image reproduction data in a certain image position is (R',G',B'), the parameters k1, k2, k3, and k4 are determined by the following equation such that image sensing data (Mg',Gr',Cy',Ye') is converted into image reproduction data (R',G',B'). In the following equation, the parameter k1 is set beforehand as a constant, and an important factor in the color balance adjustment is the parameter ratio.

$$\begin{bmatrix} k2 \\ k3 \\ k4 \end{bmatrix} = \begin{pmatrix} a12 \cdot Gr' & a13 \cdot Cy' & a14 \cdot Ye' \\ a22 \cdot Gr' & a23 \cdot Cy' & a24 \cdot Ye' \\ a32 \cdot Gr' & a33 \cdot Cy' & a34 \cdot Ye' \end{pmatrix}^{-1} \begin{pmatrix} R' - a11 \cdot k1 \cdot Mg' \\ G' - a21 \cdot k1 \cdot Mg' \\ B' - a31 \cdot k1 \cdot Mg' \end{pmatrix} \quad (7)$$

By the use of the above method, the image reproduction parameters k1, k2, k3, and k4 can be determined by using the image sensing data (Mg',Gr',Cy',Ye') in a certain indicated position and the designated data (R',G',B').

Modifications of the Fifth Embodiment

In the above embodiment, the image position indicating unit 124 can be so designed that an operator inputs numerical values (coordinates) by using a keyboard. Alternatively, dummy reproduced image data is obtained by performing image reproduction processing (e.g., white balance processing) using a default image reproduction parameter for the image sensing data held in the image sensing data holding unit 121, and displayed on, e.g., a monitor. In this case, an image position can be indicated by using a pointing device such as a light pen, a mouse, or a touch panel and a pointing mechanism. This further facilitates the operation.

Furthermore, the value of color information (image data in an indicated position) in a particular region can be directly input from, e.g., a keyboard. Alternatively, it is possible to display a color palette previously stored in the ROM 127a on a monitor and allow an operator to choose a desired color from the palette. This further facilitates the operation. Also, a so-called color picker can be displayed on a monitor by the processing of the control unit 127. In this case, by using expressions representing the attributes of a color such as the hue, saturation, and lightness, it is possible to supply color information by using all or some of these attributes.

The color information can also be conceptually supplied by using words or symbols. This is effective when there is a color that the user wants to reproduce more beautifully or to emphasize, i.e., when image reproduction is performed by using an expression such as "color of sky", "color of leaf", "color of sea", or "color of skin".

In the fifth embodiment and its modifications as described above, the position of an image is designated, color information pertaining to the designated position is input, and an image reproduction parameter is determined on the basis of image sensing data corresponding to the designated position and the input color information. Reproduced image data is obtained by performing image reproduction processing for the image sensing data by using the determined image reproduction parameter. Accordingly, the color balance of the whole image can be adjusted by using an object of a given color in a given position on the screen. This solves the problem of white balance adjustment that the adjustment is impossible when an image has no white object or only a very few white objects exist in an image. Also, by supplying a color (e.g., "color of skin") that the user wants to reproduce more accurately, as color information, it is possible to accurately reproduce a place where the user wants to reproduce and a color belonging to the place, or a color that the user wants to reproduce.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for reproducing a plurality of pictures, comprising:

designating means for designating a selection condition for selecting a plurality of pictures which are stored in a memory and which meet the selection condition;

selecting means for selecting said plurality of pictures which are stored in the memory and which meet the selection condition designated by said designating means;

holding means for reading the plurality of pictures selected by said selecting means into the memory, and holding the read plurality of pictures in said holding means;

setting means for setting an image reproduction parameter based on information in the plurality of pictures held by said holding means; and reproducing means for reproducing a plurality of reproduced pictures from the plurality of pictures held by said holding means by using the image reproduction parameter set by said setting means.

2. The apparatus according to claim 1, wherein the image reproduction parameter relates to white balance.

3. The apparatus according to claim 1, wherein the selection condition includes at least one of a photographing time, a photographing date, a photographing place, a photographing mode, an EV value, a shutter speed, an aperture value, an object distance, the use/nonuse of an electronic flash, and the use/nonuse of an optical filter.

4. The apparatus according to claim 1, wherein the plurality of image data selected on the basis of the selection condition forms a synthetic picture.

5. The apparatus according to claim 4, wherein said selecting means selects the plurality of image data for forming a synthetic picture on the basis of information added to the plurality of image data.

6. Apparatus according to claim 1, wherein said designating means designates a selection condition from among a group consisting of color temperature information, composition of an object, photographing time, photographing mode, photographing place, EV value, aperture value, object distance, shutter speed, use/nonuse of an electronic flash, or the use/nonuse of an optical low-pass filter.

7. An image processing method for reproducing a plurality of pictures, comprising the steps of:

designating a selection condition for selecting a plurality of pictures which are stored in a memory and which meet the selection condition;

selecting said plurality of pictures which are stored in the memory and which meet the selection condition designated in said designation step;

reading the plurality of pictures selected in said selecting step into the memory and causing hold as to hold the read plurality of pictures;

setting an image reproduction parameter based on information in the plurality of pictures held by the holding means; and reproducing a plurality of reproduced pictures from the plurality of pictures held by the holding means by using the image reproduction parameter set in said setting step.

8. A method according to claim 7, wherein the designating step designates a selection condition from among a group consisting of color temperature information, composition of an object, photographing time, photographing mode, photographing place, EV value, aperture value, object distance, shutter speed, use/nonuse of an electronic flash, or the use/nonuse of an optical low-pass filter.

* * * * *

UNITED STATES PATENT AND TRADEMARK OFFICE
CERTIFICATE OF CORRECTION

PATENT NO. : 6,160,579  
DATED : December 12, 2000  
INVENTOR(S) : Yoshinobu Shiraiwa et al.

Page 1 of 1

It is certified that error appears in the above-identified patent and that said Letters Patent is hereby corrected as shown below:

Drawings,
Sheet 2 of 15, FIG.3, "PARAMEETER" should read -- PARAMETER --.

Column 4,
Line 32, "intention" should read -- invention --.

Column 6,
Line 39, "SIN ratio," should read -- S/N ratio, --.

Column 13,
Line 10, "Yellow" should read -- yellow --;
Line 24, "$G_{Gr,}$" should read -- $K_{Gr,}$ --.

Column 17,
Line 4, "these" should read -- this --;
Line 14, "parameters" should read -- parameters that --.

Column 20,
Line 40, "all" should read -- a l l --.

Column 22,
Line 46, "hold as" should read -- said holding means --.

Signed and Sealed this

Eighteenth Day of December, 2001

*Attest:*

JAMES E. ROGAN
*Director of the United States Patent and Trademark Office*

*Attesting Officer*